(12) United States Patent
Xu et al.

(10) Patent No.: US 11,838,792 B2
(45) Date of Patent: Dec. 5, 2023

(54) DATA TRANSMISSION METHOD, NETWORK DEVICE, AND TERMINAL DEVICE

(71) Applicant: HUAWEI TECHNOLOGIES CO., LTD., Guangdong (CN)

(72) Inventors: Xiaoying Xu, Shenzhen (CN); Jun Chen, Shanghai (CN); Qufang Huang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/683,996

(22) Filed: Mar. 1, 2022

(65) Prior Publication Data
US 2022/0248260 A1 Aug. 4, 2022

Related U.S. Application Data

(63) Continuation of application No. 16/584,299, filed on Sep. 26, 2019, now Pat. No. 11,284,291, which is a
(Continued)

(30) Foreign Application Priority Data

Jun. 15, 2017 (CN) .......................... 201710450223.1

(51) Int. Cl.
*H04W 28/02* (2009.01)
*H04L 47/32* (2022.01)
(Continued)

(52) U.S. Cl.
CPC ......... *H04W 28/0278* (2013.01); *H04L 47/32* (2013.01); *H04L 47/6255* (2013.01);
(Continued)

(58) Field of Classification Search
CPC ......... H04W 28/0278; H04W 72/0406; H04W 80/08; H04W 76/27; H04W 72/0426; H04W 88/08; H04L 47/32; H04L 47/6255
See application file for complete search history.

(56) References Cited

U.S. PATENT DOCUMENTS 8,934,360 B2 1/2015 Dai et al.
9,019,818 B2 4/2015 Wu et al.
(Continued)

FOREIGN PATENT DOCUMENTS

CN 101384078 3/2009
CN 101541099 9/2009
(Continued)

OTHER PUBLICATIONS

EPO Communication pursuant to Article 94(3) EPC issued in European Application No. 18816770.4 dated Nov. 3, 2021, 8 pages.
(Continued)

*Primary Examiner* — Donald L Mills
(74) *Attorney, Agent, or Firm* — Fish & Richardson P.C.

(57) ABSTRACT

The present disclosure relates to data transmission methods, network devices. One example data transmission method includes: a first network node sends a first indication information to a second network node, the first indication information includes information about an uplink data volume of a buffer of a terminal device, or the first indication information indicates a relationship between an uplink data volume of a buffer of a terminal device and a predefined data volume threshold.

15 Claims, 12 Drawing Sheets

Related U.S. Application Data continuation of application No. PCT/CN2018/091627, filed on Jun. 15, 2018.

(51) Int. Cl.
   *H04L 47/625*     (2022.01)
   *H04W 80/08*     (2009.01)
   *H04W 72/20*     (2023.01)
   *H04W 76/27*     (2018.01)

(52) U.S. Cl.
   CPC .......... *H04W 72/20* (2023.01); *H04W 80/08* (2013.01); *H04W 76/27* (2018.02)

(56) References Cited

U.S. PATENT DOCUMENTS

| | | | |
|---|---|---|---|
| 2014/0269352 | A1 | 9/2014 | Sun et al. |
| 2015/0271093 | A1 | 9/2015 | Cui et al. |
| 2016/0088647 | A1* | 3/2016 | Yi .................. H04W 72/21 370/329 |
| 2016/0182286 | A1 | 6/2016 | Lundén et al. |
| 2016/0295572 | A1 | 10/2016 | Hahn et al. |
| 2017/0111927 | A1 | 4/2017 | Kim et al. |
| 2017/0265106 | A1 | 9/2017 | Andreoli-Fang et al. |
| 2018/0270699 | A1* | 9/2018 | Babaei ............. H04W 28/0278 |
| 2018/0270873 | A1 | 9/2018 | Cho et al. |
| 2018/0332659 | A1 | 11/2018 | Iwang et al. |
| 2019/0090229 | A1* | 3/2019 | Iwai .................. H04W 72/1289 |
| 2019/0387577 | A1* | 12/2019 | Parron .................. H04W 72/14 |
| 2020/0077431 | A1* | 3/2020 | Tang ..................... H04W 72/06 |
| 2020/0236695 | A1* | 7/2020 | Yang ................. H04W 72/1284 |

FOREIGN PATENT DOCUMENTS

| | | |
|---|---|---|
| CN | 103533662 | 1/2014 |
| CN | 104519486 A | 4/2015 |
| CN | 104823507 | 8/2015 |
| CN | 105191216 A | 12/2015 |
| CN | 106416410 A | 2/2017 |
| EP | 2166812 | 3/2010 |
| KR | 20150109979 A | 10/2015 |
| WO | 2017034230 | 3/2017 |

OTHER PUBLICATIONS

EPO Partial Supplementary European Search Report issued in European Application No. 18816770.4 dated Feb. 6, 2020, 15 pages.

Intel Corporation, "RAN functional split: intra MAC split description and benefits," 3GPP TSG RAN WG3 Meeting #93-bis, R3-162232; Sophia Antipolis, France, Oct. 10-14, 2016, 5 pages.

LG Electronics, "BSR enhancement for New RAT," 3GPP TSG-RAN WG2 Meeting #97bis, R2-1703492; Spokane, USA, Apr. 3-7, 2017, 3 pages.

Mediatek Inc, "Control Information at Access," 3GPP TSG-RAN2 #96 Meeting, R2-168837; Reno, USA, Nov. 14-18, 2016, 4 pages.

PCT International Search Report and Written Opinion issued in International Application No. PCT/CN2018/091627 dated Aug. 30, 2018, 20 pages (with English translation).

Office Action in Chinese Appln. No. 201710450223.1, dated Feb. 8, 2023, 9 pages.

* cited by examiner

DATA TRANSMISSION METHOD, NETWORK DEVICE, AND TERMINAL DEVICE

CROSS-REFERENCE TO RELATED APPLICATIONS

This application is a continuation of U.S. application Ser. No. 16/584,299, filed on Sep. 26, 2019, which claims priority to International Application No. PCT/CN2018/091627, filed on Jun. 15, 2018, which claims priority to Chinese Patent Application No. 201710450223.1, filed on Jun. 15, 2017. All of the aforementioned patent applications are hereby incorporated by reference in their entireties.

TECHNICAL FIELD

This application relates to the communications field, and more specifically, to a data transmission method, a network device, and a terminal device.

BACKGROUND

In a cloud radio access network (Cloud Radio Access Network, CRAN) architecture, separation of a CRAN control node (Central Unit or Control Unit, CU) from a data unit (Data Unit or Distributed Unit, DU) is introduced, that is, an overall baseband processing unit (Building Base Band Unit, BBU) that is originally deployed is divided into two parts. A difference from an original base station architecture lies in that, because of separation of the CU from the DU, an interface between the CU and the DU is introduced, and information that is originally exchanged in a base station needs to be transferred through the interface between the CU and the DU.

A radio resource control (Radio Resource Control, RRC) connection establishment procedure is a necessary procedure when a terminal accesses a communications network. In a network architecture in which an existing base station is used as an independent device, for example, in a long term evolution (Long Term Evolution, LTE) system, the base station supports all protocol layer processing, and the RRC connection establishment procedure may be directly processed by the base station. In a 5G system, if a function of the base station is implemented by a DU and a CU, the RRC connection process needs to be processed by the DU and the CU through interaction. Therefore, a processing method and an interface transmission method need to be provided when the DU and the CU establish an RRC connection.

At present, a state switching solution in an architecture including the CU and the DU is not supported, and the CU cannot perceive a buffer status report (Buffer Status Report, BSR) reported by a user, that is, can neither perceive a data buffer of a terminal device in time nor switch the terminal device to an active state or perform a high-throughput multi-connection configuration in time. When the CU instructs the terminal device to change a key, the CU can perform security processing by using only a new key, and the CU fails to decrypt data that is being sent before a switching command is received and that is protected by using an old key.

SUMMARY

This application provides a data transmission method, a network device, and a terminal device, so that when some functions of a network device are separated and serve as different network nodes, a second network node can perceive change information of a data volume of a terminal device or a service in time, the second network node can perceive, in time, that the terminal device has performed a random access procedure, and the second network node can implicitly perceive that a key of the terminal device has already been changed completely.

According to a first aspect, a data transmission method is provided. The method includes: receiving, by a first network node, a first report from a terminal device, where the first report is used to indicate an uplink data volume of a buffer of the terminal device; and sending, by the first network node, first indication information to a second network node, where the first indication information includes information about the uplink data volume of the buffer of the terminal device, or the first indication information is used to indicate a relationship between the uplink data volume of the buffer of the terminal device and a predefined data volume threshold.

In some possible implementations, the first report is a buffer status report BSR.

In some possible implementations, the first report is the information of the data volume of the buffer of the terminal device and MAC control information multiplexed by first information, and the first information may be a power headroom report.

In some possible implementations, the relationship between the uplink data volume of the buffer of the terminal device and the predefined data volume threshold is that the uplink data volume of the buffer of the terminal device is greater than, less than, or equal to the predefined data volume threshold.

In some possible implementations, the first indication information is further used to instruct the second network node to perform state switching or perform offloading configuration of a radio bearer for the terminal device.

In some possible implementations, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

With reference to the first aspect, in a first possible implementation of the first aspect, the method further includes: receiving, by the first network node, second indication information sent by the second network node, where the second indication information is used to indicate the predefined data volume threshold to the first network node, or the second indication information is used to instruct the first network node to send the information about the uplink data volume of the buffer of the terminal device to the second network node; and the sending, by the first network node, first indication information to a second network node includes: sending, by the first network node, the first indication information to the second network node according to the second indication information.

In some possible implementations, if the uplink data volume of the buffer of the terminal device is greater than or equal to the predefined data volume threshold, the first network node sends the first indication information to the second network node.

With reference to the first aspect or the first possible implementation of the first aspect, in a second possible implementation of the first aspect, the first network node includes at least one of a function of a radio link layer control protocol layer, a function of a media access control layer, and a function of a physical layer; and/or the second network node includes at least one of a function of a packet data convergence protocol layer, a function of a service data adaptation layer, and a radio resource control function.

In some possible implementations, the second indication information is used to instruct the first network node to enable reporting of the first indication information; and the sending, by the first network node, first indication information to a second network node includes: sending, by the first network node, the first indication information to the second network node according to the second indication information.

According to the data transmission method in this embodiment of this application, when some functions of a network device are separated and serve as different network nodes, the network device can perceive change information of a data volume of a terminal device or a service in time. This prevents the terminal device from redesigning a buffer data volume change notification for the second network node.

According to a second aspect, a data transmission method is provided. The method includes: receiving, by a second network node, a first indication message sent by a first network node, where the first indication message is used to indicate information about an uplink data volume of a buffer of the terminal device to the second network node, or the first indication information is used to indicate a relationship between an uplink data volume of a buffer of the terminal device and a predefined data volume threshold; and determining, by the second network node according to the first indication message, whether to perform state switching or perform offloading configuration of a radio bearer for the terminal device.

In some possible implementations, the relationship between the uplink data volume of the buffer of the terminal device and the predefined data volume threshold is that the uplink data volume of the buffer of the terminal device is greater than, less than, or equal to the predefined data volume threshold.

In some possible implementations, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

With reference to the second aspect, in a first possible implementation of the second aspect, the method further includes: sending, by the second network node, second indication information to the first network node, where the second indication information is used to indicate the predefined data volume threshold to the first network node, or the second indication information is used to instruct the first network node to send the information about the uplink data volume of the buffer of the terminal device to the second network node.

In some possible implementations, the second indication information is used to instruct the first network node to enable reporting of the information about the data volume.

In some possible implementations, the second indication information is used to instruct the first network node to enable reporting of the information about the data volume for a specified terminal device, a specified bearer, or a specified logical channel.

In some possible implementations, the second indication information is further used to instruct the first network node to send the first indication information to the second network node if the uplink data volume of the buffer of the terminal device is greater than or equal to the predefined data volume threshold.

With reference to the second aspect or the first possible implementation of the second aspect, in a second possible implementation of the second aspect, the state switching includes switching from an inactive state to an active state.

With reference to any one of the second aspect or the first and second possible implementations of the second aspect, in a third possible implementation of the second aspect, the first network node includes at least one of a function of a radio link layer control protocol layer, a function of a media access control layer, and a function of a physical layer; and/or the second network node includes at least one of a function of a packet data convergence protocol layer, a function of a service data adaptation layer, and a radio resource control function.

According to a third aspect, a data transmission method is provided. The method includes: sending, by a terminal device, a first report to a first network node, where the first report is used to indicate an uplink data volume of a buffer of the terminal device; and receiving, by the terminal device, indication information sent by a second network node, where the indication information is used to determine whether to perform state switching or perform offloading configuration of a radio bearer for the terminal device.

In some possible implementations, the first report is a buffer status report BSR.

In some possible implementations, the first report is the information of the data volume of the buffer of the terminal device and MAC control information multiplexed by first information, and the first information may be a power headroom report.

In some possible implementations, the first indication information is further used to instruct the second network node to perform state switching or perform offloading configuration of a radio bearer for the terminal device.

In some possible implementations, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

With reference to the third aspect, in a first possible implementation of the third aspect, the first network node includes at least one of a function of a radio link layer control protocol layer, a function of a media access control layer, and a function of a physical layer; and/or the second network node includes at least one of a function of a packet data convergence protocol layer, a function of a service data adaptation layer, and a radio resource control function.

According to a fourth aspect, a data transmission method is provided. The method includes: receiving, by a first network node, uplink data sent by the terminal, where the first network node includes at least one of a function of a radio link layer control protocol layer, a function of a media access control layer, and a function of a physical layer; and sending, by the first network node, third indication information to a second network node, where the third indication information is used to indicate, to the second network node, that the uplink data is uplink data that is sent in a random access procedure or after random access or uplink data that is sent on an uplink grant, and the second network node includes at least one of a function of a packet data convergence protocol layer, a function of a service data adaptation layer, and a radio resource control function.

With reference to the fourth aspect, in a first possible implementation of the fourth aspect, before the receiving, by a first network node, uplink data sent by the terminal device, the method further includes: receiving, by the first network node, a random access preamble sequence sent by the terminal device; and sending, by the first network node, a random access response to the terminal device.

With reference to the fourth aspect, in a second possible implementation of the fourth aspect, the receiving, by a first network node, uplink data sent by the terminal includes: receiving, by the first network node on the uplink grant, the uplink data sent by the terminal device.

With reference to any one of the fourth aspect or the first and second possible implementations of the fourth aspect, in a third possible implementation of the fourth aspect, the sending third indication information to a second network node includes: sending, by the first network node, the third indication information to the second network node on a dedicated bearer, where the dedicated bearer is a dedicated bearer between the first network node and the second network node that corresponds to the terminal device.

With reference to any one of the fourth aspect or the first and second possible implementations of the fourth aspect, in a fourth possible implementation of the fourth aspect, the sending third indication information to a second network node includes: sending, by the first network node, the third indication information to the second network node on a common channel, where the common channel is a channel between the first network node and the second network node that is used by the terminal device to send the uplink data in the random access procedure.

In some possible implementations, the third indication information includes identifier information of the terminal device.

In some possible implementations, the method further includes: sending, by the first network node, the uplink grant configuration parameter to the terminal device.

In some possible implementations, the method further includes: receiving, by the first network node, an uplink grant configuration parameter request message sent by the second network node; and sending, by the first network node, the uplink grant configuration parameter to the second network node based on the uplink grant configuration parameter request message.

In some possible implementations, the first network node receives the uplink grant configuration parameter sent by the second network node.

In some possible implementations, the identifier information is a cell radio network temporary identifier or context identifier information of the terminal device.

According to the data transmission method in this embodiment of this application, when some functions of a network device are separated and serve as different network nodes, the second network node can perceive, in time, that a terminal device has performed a random access procedure, and the second network node can implicitly perceive that a key of the terminal device has already been changed completely.

According to a fifth aspect, a data transmission method is provided. The method includes: receiving, by a first network node, a dedicated random access preamble sequence sent by the terminal, where the first network node includes at least one of a function of a radio link layer control protocol layer, a function of a media access control layer, and a function of a physical layer; and sending, by the first network node, third indication information to a second network node, where the third indication information is used to indicate, to the second network node, that the terminal device has performed a random access procedure, and the second network node includes at least one of a function of a packet data convergence protocol layer, a function of a service data adaptation layer, and a radio resource control function.

With reference to the fifth aspect, in a first possible implementation of the fifth aspect, the sending third indication information to a second network node includes: sending, by the first network node, the third indication information to the second network node on a dedicated bearer, where the dedicated bearer is a dedicated bearer between the first network node and the second network node that corresponds to the terminal device.

With reference to the fifth aspect, in a second possible implementation of the fifth aspect, the sending third indication information to a second network node includes: sending, by the first network node, the third indication information to the second network node on a common channel, where the common channel is a channel between the first network node and the second network node that is used by the terminal device to send the uplink data in the random access procedure.

In some possible implementations, the third indication information includes identifier information of the terminal device.

In some possible implementations, the method further includes: sending, by the first network node, the dedicated random access preamble sequence to the terminal device.

In some possible implementations, the method further includes: receiving, by the first network node, a preamble sequence request message sent by the second network node; and sending, by the first network node, the dedicated random access preamble sequence to the second network node based on the preamble sequence request message.

In some possible implementations, the method further includes: receiving, by the first network node, the dedicated random access preamble sequence sent by the second network node.

In some possible implementations, the identifier information is a cell radio network temporary identifier or context identifier information of the terminal device.

According to the data transmission method in this embodiment of this application, when some functions of a network device are separated and serve as different network nodes, the second network node can perceive, in time, that a terminal device has performed a random access procedure, and the second network node can implicitly perceive that a key of the terminal device has already been changed completely.

According to a sixth aspect, a data transmission method is provided. The method includes: sending, by a second network node, a first message, where the first message is used to instruct a terminal device to change a key, and the second network node includes at least one of a function of a packet data convergence protocol layer, a function of a service data adaptation layer, and a radio resource control function; and receiving, by the second network node, third indication information sent by a first network node, where the third indication information is used to indicate, to the second network node, that uplink data received by the first network node is uplink data that is sent in a random access procedure or after a random access procedure or uplink data that is sent on an uplink grant, or the third indication information is used to indicate, to the second network node, that the terminal device has performed a random access procedure, and the first network node includes at least one of a function of a radio link layer control protocol layer, a function of a media access control layer, and a function of a physical layer.

In some possible implementations, the first message includes a dedicated random access preamble sequence of the terminal device or an uplink grant configuration parameter used to send data.

With reference to the sixth aspect, in a first possible implementation of the sixth aspect, the receiving, by the second network node, third indication information sent by the first network node includes: receiving, by the second network node on a dedicated bearer, the third indication information sent by the second network node, where the dedicated bearer is a dedicated bearer between the first network node and the second network node that corresponds to the terminal device.

With reference to the sixth aspect, in a second possible implementation of the sixth aspect, the receiving, by the second network node, third indication information sent by the first network node includes: receiving, by the second network node on a common channel, the third indication information sent by the second network node, where the common channel is a channel between the first network node and the second network node that is used by the terminal device to send the uplink data in the random access procedure.

In some possible implementations, the third indication information includes the dedicated random access preamble sequence of the terminal device or identifier information of the terminal device.

In some possible implementations, the method further includes: sending, by the second network node, a preamble sequence request message or an uplink grant configuration parameter request message to the first network node; and receiving, by the second network node, the dedicated random access preamble sequence sent by the first network node or an uplink grant configuration parameter used to send data.

In some possible implementations, the second network node sends, to the first network node, the dedicated random access preamble sequence or the uplink grant configuration parameter used to send data.

In some possible implementations, the identifier information is a cell radio network temporary identifier or context identifier information of the terminal device.

According to a seventh aspect, a data transmission method is provided. The method includes: receiving, by a terminal device, a first message from a second network node, where the first message is used to instruct the terminal device to change a key, and the second network node includes at least one of a function of a packet data convergence protocol layer, a function of a service data adaptation layer, and a radio resource control function; and sending, by the terminal device, uplink data to a first network node, where the first network node includes at least one of a function of a radio link layer control protocol layer, a function of a media access control layer, and a function of a physical layer.

With reference to the seventh aspect, in a first possible implementation of the seventh aspect, before the sending, by the terminal device, uplink data to a first network node, the method further includes: sending, by the terminal device, a random access preamble sequence to the first network node; and receiving, by the terminal device, a random access response sent by the first network node.

With reference to the seventh aspect, in a second possible implementation of the seventh aspect, before the sending, by the terminal device, uplink data to a first network node, the method further includes: receiving, by the terminal device, an uplink grant configuration parameter; and the sending, by the terminal device, uplink data to a first network node includes: sending, by the terminal device, the uplink data to the first network node on an uplink grant.

In some possible implementations, the first message includes the uplink grant configuration parameter of the terminal device.

In some possible implementations, the uplink data includes identifier information of the terminal device.

In some possible implementations, the identifier information is a cell radio network temporary identifier or context identifier information of the terminal device.

In some possible implementations, the method further includes: receiving, by the terminal device, the uplink grant configuration parameter sent by the first network node.

According to an eighth aspect, a data transmission method is provided. The method includes: receiving, by a terminal device, a first message from a second network node, where the first message is used to instruct the terminal device to change a key, and the second network node includes at least one of a function of a packet data convergence protocol layer, a function of a service data adaptation layer, and a radio resource control function; and sending, by the terminal device, a dedicated random access preamble sequence of the terminal device to a first network node, where the first network node includes at least one of a function of a radio link layer control protocol layer, a function of a media access control layer, and a function of a physical layer.

With reference to the eighth aspect, in a first possible implementation of the eighth aspect, the first message includes the dedicated random access preamble sequence of the terminal device.

With reference to the eighth aspect, in a second possible implementation of the eighth aspect, the method further includes: receiving, by the terminal device, the dedicated random access preamble sequence of the terminal device sent by the first network node.

According to a ninth aspect, a data transmission method is provided. The method includes: when there is first data in a buffer of a terminal device or a data volume of first data exceeds a predefined data volume threshold or a discard timer of first data expires within a predefined time length, triggering, by the terminal device, a second report, where the second report is used to indicate that the first data in the buffer of the terminal device needs to be sent.

In some possible implementations, the first data is data considered to be relatively important on a bearer. For example, an I frame or a bidirectional P frame in video frames is data more important than a unidirectional P frame. It is not excluded that definition of importance may be agreed on by an operator or an application provider and a user. This is not limited herein.

With reference to the ninth aspect, in a first possible implementation of the ninth aspect, before the triggering, by the terminal device, a second report, the method further includes: receiving, by the terminal device, fourth indication information sent by a third network node, where the fourth indication information is used to instruct the terminal device to trigger the data report on a specified logical channel or bearer.

With reference to the first possible implementation of the ninth aspect, in a second possible implementation of the ninth aspect, the third network node includes at least one of a function of a radio resource control protocol layer, a function of a packet data convergence protocol layer, a function of a radio link layer control protocol layer, a function of a media access control layer, and a function of a physical layer.

According to the data transmission method in this embodiment of this application, when there is important data in the buffer of the terminal device, a network device can be notified in time.

According to a tenth aspect, a data transmission method is provided. The method includes: sending, by a third network node, fourth indication information to a terminal device, where the fourth indication information is used to instruct the terminal device to trigger a second report on a specified logical channel or bearer, and the second report is used to indicate that the first data in a buffer of the terminal device needs to be sent; and receiving, by the third network node, the second report on the specified logical channel or bearer.

In some possible implementations, the third network node includes at least one of a function of a radio link layer control protocol layer, a function of a media access control layer, and a function of a physical layer.

In some possible implementations, the first data is data considered to be relatively important on a bearer. For example, an I frame or a bidirectional P frame in video frames is data more important than a unidirectional P frame. It is not excluded that definition of importance may be agreed on by an operator or an application provider and a user. This is not limited herein.

According to an eleventh aspect, a network device is provided. The network device includes: a transceiver module, configured to receive a first report from a terminal device, where the first report is used to indicate information about an uplink data volume of a buffer of the terminal device; and a processing module, configured to generate first indication information, where the first indication information includes the uplink data volume of the buffer of the terminal device, or the first indication information is used to indicate a relationship between the uplink data volume of the buffer of the terminal device and a predefined data volume threshold, where the transceiver module is further configured to send the first indication information to a second network node.

In some possible implementations, the first report is a buffer status report BSR.

In some possible implementations, the first report is the information of the data volume of the buffer of the terminal device and MAC control information multiplexed by first information, and the first information may be a power headroom report.

In some possible implementations, the first indication information is further used to instruct the second network node to perform state switching or perform offloading configuration of a radio bearer for the terminal device.

In some possible implementations, the relationship between the uplink data volume of the buffer of the terminal device and the predefined data volume threshold is that the uplink data volume of the buffer of the terminal device is greater than, less than, or equal to the predefined data volume threshold.

In some possible implementations, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

With reference to the eleventh aspect, in a first possible implementation of the eleventh aspect, the transceiver module is further configured to receive second indication information sent by the second network node, where the second indication information is used to indicate the predefined data volume threshold to the first network node, or the second indication information is used to instruct the first network node to send the information about the uplink data volume of the buffer of the terminal device to the second network node; and the transceiver module is specifically configured to send the first indication information to the second network node according to the second indication information.

In some possible implementations, if the uplink data volume of the buffer of the terminal device is greater than or equal to the predefined data volume threshold, the transceiver module is further configured to send the first indication information to the second network node.

In some possible implementations, the second indication information is used to instruct the first network node to enable reporting of the first indication information; and the transceiver module is specifically configured to send the first indication information to the second network node according to the second indication information.

With reference to the eleventh aspect or the first possible implementation of the eleventh aspect, in a second possible implementation of the eleventh aspect, the network device includes at least one of a function of a radio link layer control protocol layer, a function of a media access control layer, and a function of a physical layer; and/or the second network node includes at least one of a function of a packet data convergence protocol layer, a function of a service data adaptation layer, and a radio resource control function.

When some functions of the network device in this embodiment of this application are separated and serve as different network nodes, the network device can perceive change information of a data volume of a terminal device or a service in time. This prevents the terminal device from redesigning a buffer data volume change notification for the second network node.

According to a twelfth aspect, a network device is provided. The network device includes: a transceiver module, configured to receive a first indication message sent by a first network node, where the first indication message is used to indicate information about an uplink data volume of a buffer of the terminal device to the second network node, or the first indication information is used to indicate a relationship between an uplink data volume of a buffer of the terminal device and a predefined data volume threshold; and a processing module, configured to determine, according to the first indication message, whether to perform state switching or perform offloading configuration of a radio bearer for the terminal device.

In some possible implementations, the relationship between the uplink data volume of the buffer of the terminal device and the predefined data volume threshold is that the uplink data volume of the buffer of the terminal device is greater than, less than, or equal to the predefined data volume threshold.

In some possible implementations, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

With reference to the twelfth aspect, in a first possible implementation of the twelfth aspect, the transceiver module is further configured to send second indication information to the first network node, where the second indication information is used to indicate the predefined data volume threshold to the first network node, or the second indication information is used to instruct the first network node to send the information about the uplink data volume of the buffer of the terminal device to the second network node.

In some possible implementations, the second indication information is further used to instruct the first network node to send the first indication information to the second network node if the uplink data volume of the buffer of the terminal device is greater than or equal to the predefined data volume threshold.

With reference to the twelfth aspect or the first possible implementation of the twelfth aspect, in a second possible implementation of the twelfth aspect, the state switching includes switching from an inactive state to an active state.

With reference to any one of the twelfth aspect or the first and second possible implementations of the twelfth aspect, in a third possible implementation of the twelfth aspect, the first network node includes at least one of a function of a radio link layer control protocol layer, a function of a media access control layer, and a function of a physical layer; and/or the network device includes at least one of a function of a packet data convergence protocol layer, a function of a service data adaptation layer, and a radio resource control function.

In some possible implementations, the second indication information is used to instruct the first network node to enable reporting of the information about the data volume.

In some possible implementations, the second indication information is used to instruct the first network node to enable reporting of the information about the data volume for a specified terminal device, a specified bearer, or a specified logical channel.

According to a thirteenth aspect, a terminal device is provided. The terminal device includes: a processing module, configured to generate a first report, where the first report is used to indicate an uplink data volume of a buffer of the terminal device; and a transceiver module, configured to send the first report to a first network node, where the transceiver module is further configured to receive indication information sent by a second network node, where the indication information is used to determine whether to perform state switching or perform offloading configuration of a radio bearer for the terminal device.

In some possible implementations, the first report is a buffer status report BSR.

In some possible implementations, the first report is the information of the data volume of the buffer of the terminal device and MAC control information multiplexed by first information, and the first information may be a power headroom report.

In some possible implementations, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

With reference to the thirteenth aspect, in a first possible implementation of the thirteenth aspect, the first network node includes at least one of a function of a radio link layer control protocol layer, a function of a media access control layer, and a function of a physical layer; and/or the second network node includes at least one of a function of a packet data convergence protocol layer, a function of a service data adaptation layer, and a radio resource control function.

According to a fourteenth aspect, a network device is provided. The network device includes: a transceiver module, configured to receive uplink data sent by a terminal, where the network device includes at least one of a function of a radio link layer control protocol layer, a function of a media access control layer, and a function of a physical layer; and a processing module, configured to generate third indication information, where the third indication information is used to indicate, to the second network node, that the uplink data is uplink data that is sent in a random access procedure or after random access, where the transceiver module is further configured to send the third indication information to the second network node, where the second network node includes at least one of a function of a packet data convergence protocol layer, a function of a service data adaptation layer, and a radio resource control function.

With reference to the fourteenth aspect, in a first possible implementation of the fourteenth aspect, the transceiver module is further configured to: receive a random access preamble sequence sent by the terminal device; and send a random access response to the terminal device.

With reference to the fourteenth aspect, in a second possible implementation of the fourteenth aspect, the transceiver module is specifically configured to receive, on the uplink grant, the uplink data sent by the terminal device.

With reference to any one of the fourteenth aspect or the first and second possible implementations of the fourteenth aspect, in a third possible implementation of the twelfth aspect, the transceiver module is specifically configured to send the third indication information to the second network node on a dedicated bearer, where the dedicated bearer is a dedicated bearer between the first network node and the second network node that corresponds to the terminal device.

With reference to any one of the fourteenth aspect or the first and second possible implementations of the fourteenth aspect, in a fourth possible implementation of the twelfth aspect, the transceiver module is specifically configured to send the third indication information to the second network node on a common channel, where the common channel is a channel between the first network node and the second network node that is used by the terminal device to send the uplink data in the random access procedure.

In some possible implementations, the third indication information includes identifier information of the terminal device.

In some possible implementations, the transceiver module is further configured to send an uplink grant configuration parameter of the terminal device to the terminal device.

In some possible implementations, the transceiver module is further configured to receive an uplink grant configuration parameter request message sent by the second network node; and the processing module is further configured to control, based on the uplink grant configuration parameter request message, the transceiver module to send the uplink grant configuration parameter to the second network node.

In some possible implementations, the transceiver module is further configured to receive the uplink grant configuration parameter sent by the second network node.

In some possible implementations, the identifier information is a cell radio network temporary identifier or context identifier information of the terminal device.

According to the network device in this embodiment of this application, when some functions of the network device are separated and serve as different network nodes, the second network node can perceive, in time, that a terminal device has performed a random access procedure, and the second network node can implicitly perceive that a key of the terminal device has already been changed completely.

According to a fifteenth aspect, a network device is provided. The network device includes: a transceiver module, configured to receive a dedicated random access preamble sequence sent by the terminal, where the network device includes at least one of a function of a radio link layer control protocol layer, a function of a media access control layer, and a function of a physical layer; and a processing module, configured to generate third indication information, where the transceiver module is further configured to send third indication information to a second network node, where the third indication information is used to indicate, to the second network node, that the terminal device has performed a random access procedure, and the second network node includes at least one of a function of a packet data convergence protocol layer, a function of a service data adaptation layer, and a radio resource control function.

With reference to the fifteenth aspect, in a first possible implementation of the fifteenth aspect, the transceiver module is specifically configured to send the third indication information to the second network node on a dedicated bearer, where the dedicated bearer is a dedicated bearer between the first network node and the second network node that corresponds to the terminal device.

With reference to the fifteenth aspect, in a second possible implementation of the fifteenth aspect, the transceiver module is specifically configured to send the third indication information to the second network node on a common channel, where the common channel is a channel between the first network node and the second network node that is used by the terminal device to send the uplink data in the random access procedure.

In some possible implementations, the third indication information includes identifier information of the terminal device.

In some possible implementations, the transceiver module is further configured to send the dedicated random access preamble sequence to the terminal device.

In some possible implementations, the transceiver module is further configured to receive a preamble sequence request message sent by the second network node; and the processing module is further configured to control, based on the preamble sequence request message, the transceiver module to send the dedicated random access preamble sequence to the second network node.

In some possible implementations, the transceiver module is further configured to receive the dedicated random access preamble sequence sent by the second network node.

In some possible implementations, the identifier information is a cell radio network temporary identifier or context identifier information of the terminal device.

According to the network device in this embodiment of this application, when some functions of the network device are separated and serve as different network nodes, the second network node can perceive, in time, that a terminal device has performed a random access procedure, and the second network node can implicitly perceive that a key of the terminal device has already been changed completely.

According to a sixteenth aspect, a network device is provided. The network device includes: a processing module, configured to generate a first message, where the first message is used to instruct a terminal device to change a key; and a transceiver module, configured to send the first message, where the network device includes at least one of a function of a packet data convergence protocol layer, a function of a service data adaptation layer, and a radio resource control function, where the transceiver module is further configured to receive third indication information sent by the first network node, where the third indication information is used to indicate, to the second network node, that uplink data received by the first network node is uplink data that is sent in a random access procedure or after a random access procedure, or the third indication information is used to indicate, to the second network node, that the terminal device has performed a random access procedure, where the first network node includes at least one of a function of a radio link layer control protocol layer, a function of a media access control layer, and a function of a physical layer.

In some possible implementations, the first message includes a dedicated random access preamble sequence of the terminal device or an uplink grant configuration parameter used to send data.

With reference to the sixteenth aspect, in a first possible implementation of the sixteenth aspect, the transceiver module is specifically configured to receive, on a dedicated bearer, the third indication information sent by the second network node, where the dedicated bearer is a dedicated bearer between the first network node and the second network node that corresponds to the terminal device.

With reference to the sixteenth aspect, in a second possible implementation of the sixteenth aspect, the transceiver module is specifically configured to receive, on a common channel, the third indication information sent by the second network node, where the common channel is a channel between the first network node and the second network node that is used by the terminal device to send the uplink data in the random access procedure.

In some possible implementations, the third indication information includes the dedicated random access preamble sequence of the terminal device or identifier information of the terminal device.

In some possible implementations, the transceiver module is further configured to send a preamble sequence request message or an uplink grant configuration parameter request message to the first network node; and the second network node receives the dedicated random access preamble sequence sent by the first network node or an uplink grant configuration parameter used to send data.

In some possible implementations, the transceiver module is further configured to send, to the first network node, the dedicated random access preamble sequence or the uplink grant configuration parameter used to send data.

In some possible implementations, the identifier information is a cell radio network temporary identifier or context identifier information of the terminal device.

According to a seventeenth aspect, a terminal device is provided. The terminal device includes: a transceiver module, configured to receive a first message from a second network node, where the first message is used to instruct the terminal device to change a key, and the second network node includes at least one of a function of a packet data convergence protocol layer, a function of a service data adaptation layer, and a radio resource control function; and a processing module, configured to control the transceiver module to be further configured to send uplink data to a first network node, where the first network node includes at least one of a function of a radio link layer control protocol layer, a function of a media access control layer, and a function of a physical layer.

With reference to the seventeenth aspect, in a first possible implementation of the seventeenth aspect, the transceiver module is further configured to: send a random access preamble sequence to the first network node; and receive a random access response sent by the first network node.

With reference to the seventeenth aspect, in a second possible implementation of the seventeenth aspect, the transceiver module is further configured to receive an uplink grant configuration parameter; and the transceiver module is specifically configured to send the uplink data to the first network node on an uplink grant.

In some possible implementations, the first message includes the uplink grant configuration parameter of the terminal device.

In some possible implementations, the uplink data includes identifier information of the terminal device.

In some possible implementations, the identifier information is a cell radio network temporary identifier or context identifier information of the terminal device.

In some possible implementations, the transceiver module is further configured to receive the dedicated random access preamble sequence sent by the first network node or an uplink grant configuration parameter used to send data.

According to an eighteenth aspect, a terminal device is provided. The terminal device includes: a transceiver module, configured to receive a first message from a second network node, where the first message is used to instruct the terminal device to change a key, and the second network node includes at least one of a function of a packet data convergence protocol layer, a function of a service data adaptation layer, and a radio resource control function; and a processing module, configured to control the transceiver module to be further configured to send a dedicated random access preamble sequence of the terminal device to a first network node, where the first network node includes at least one of a function of a radio link layer control protocol layer, a function of a media access control layer, and a function of a physical layer.

With reference to the eighteenth aspect, in a first possible implementation of the eighteenth aspect, the first message includes the dedicated random access preamble sequence of the terminal device.

With reference to the eighteenth aspect, in a second possible implementation of the eighteenth aspect, the transceiver module is further configured to receive the dedicated random access preamble sequence of the terminal device sent by the first network node.

According to a nineteenth aspect, a terminal device is provided. The terminal device includes: a processing module, configured to determine that there is first data in a buffer of the terminal device or a data volume of first data exceeds a predefined data volume threshold or a discard timer of first data expires within a predefined time length; and a transceiver module, configured to trigger a second report, where the second report is used to indicate that the first data in the buffer of the terminal device needs to be sent.

With reference to the nineteenth aspect, in a first possible implementation of the nineteenth aspect, the transceiver module is further configured to receive fourth indication information sent by a third network node, where the fourth indication information is used to instruct the terminal device to send the data report on a specified logical channel or bearer.

With reference to the first possible implementation of the nineteenth aspect, in a second possible implementation of the nineteenth aspect, the third network node includes at least one of a function of a radio resource control protocol layer, a function of a packet data convergence protocol layer, a function of a radio link layer control protocol layer, a function of a media access control layer, and a function of a physical layer.

In some possible implementations, the first data is data considered to be relatively important on a bearer. For example, an I frame or a bidirectional P frame in video frames is data more important than a unidirectional P frame. It is not excluded that definition of importance may be agreed on by an operator or an application provider and a user. This is not limited herein.

According to a twentieth aspect, a network device is provided. The network device includes: a processing module, configured to generate fourth indication information, where the fourth indication information is used to instruct the terminal device to trigger a second report on a specified logical channel or bearer, and the second report is used to indicate that the first data in a buffer of the terminal device needs to be sent, and a transceiver module, configured to send fourth indication information to the terminal device, where the transceiver module is further configured to receive the second report on the specified logical channel or bearer.

In some possible implementations, the third network node includes at least one of a function of a radio resource control protocol layer, a function of a packet data convergence protocol layer, a function of a radio link layer control protocol layer, a function of a media access control layer, and a function of a physical layer.

In some possible implementations, the first data is data considered to be relatively important on a bearer. For example, an I frame or a bidirectional P frame in video frames is data more important than a unidirectional P frame. It is not excluded that definition of importance may be agreed on by an operator or an application provider and a user. This is not limited herein.

According to a twenty-first aspect, a network device is provided. The network device includes a memory and a processor, where the memory is configured to store an instruction, and the processor is configured to invoke the instruction in the memory, to perform an operation in the method according to any one of the first aspect or the possible implementations of the first aspect.

According to a twenty-second aspect, a network device is provided. The network device includes a memory and a processor, where the memory is configured to store an instruction, and the processor is configured to invoke the instruction in the memory, to perform an operation in the method according to any one of the second aspect or the possible implementations of the second aspect.

According to a twenty-third aspect, a terminal device is provided. The terminal device includes a memory and a processor, where the memory is configured to store an instruction, and the processor is configured to invoke the instruction in the memory, to perform an operation in the method according to any one of the third aspect or the possible implementations of the third aspect.

According to a twenty-fourth aspect, a network device is provided. The network device includes a memory and a processor, where the memory is configured to store an instruction, and the processor is configured to invoke the instruction in the memory, to perform an operation in the method according to any one of the fourth aspect or the possible implementations of the fourth aspect.

According to a twenty-fifth aspect, a network device is provided. The network device includes a memory and a processor, where the memory is configured to store an instruction, and the processor is configured to invoke the instruction in the memory, to perform an operation in the method according to any one of the fifth aspect or the possible implementations of the fifth aspect.

According to a twenty-sixth aspect, a network device is provided. The network device includes a memory and a processor, where the memory is configured to store an instruction, and the processor is configured to invoke the instruction in the memory, to perform an operation in the method according to any one of the sixth aspect or the possible implementations of the sixth aspect.

According to a twenty-seventh aspect, a terminal device is provided. The terminal device includes a memory and a processor, where the memory is configured to store an instruction, and the processor is configured to invoke the instruction in the memory, to perform an operation in the method according to any one of the seventh aspect or the possible implementations of the seventh aspect.

According to a twenty-eighth aspect, a terminal device is provided. The terminal device includes a memory and a processor, where the memory is configured to store an instruction, and the processor is configured to invoke the instruction in the memory, to perform an operation in the method according to any one of the eighth aspect or the possible implementations of the eighth aspect.

According to a twenty-ninth aspect, a terminal device is provided. The terminal device includes a memory and a processor, where the memory is configured to store an instruction, and the processor is configured to invoke the instruction in the memory, to perform an operation in the method according to any one of the ninth aspect or the possible implementations of the ninth aspect.

According to a thirtieth aspect, a network device is provided. The network device includes a memory and a processor, where the memory is configured to store an instruction, and the processor is configured to invoke the instruction in the memory, to perform an operation in the method according to any one of the tenth aspect or the possible implementations of the tenth aspect.

According to a thirty-first aspect, a computer-readable storage medium is provided. The computer-readable storage medium stores an instruction, where when the instruction is run on a computer, the computer is enabled to perform the methods according to the foregoing aspects.

According to a thirty-second aspect, a system chip is provided. The system chip includes an input/output interface, at least one processor, at least one memory, and a bus, where the at least one memory is configured to store an instruction, and the at least one processor is configured to invoke the instruction in the at least one memory, to perform operations in the methods according to the foregoing aspects.

DESCRIPTION OF EMBODIMENTS

The following describes the technical solutions in this application with reference to the accompanying drawings.

Figure 1:
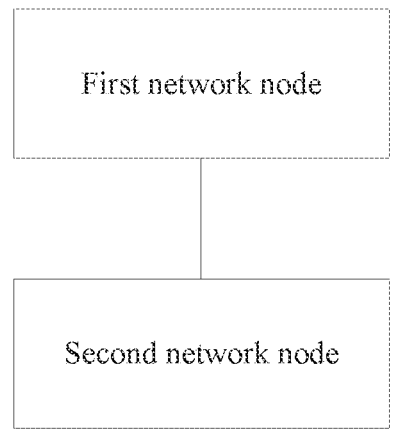
FIG. 1 is a schematic diagram of an application scenario of a technical solution according to an embodiment of this application.

The embodiments of this application are applicable to various forms of systems including some separated functions of a network device. FIG. 1 is a schematic diagram of an application scenario of a technical solution according to an embodiment of this application. As shown in FIG. 1, some functions of the network device are separated and serve as a first network node and a second network node.

Figure 2:
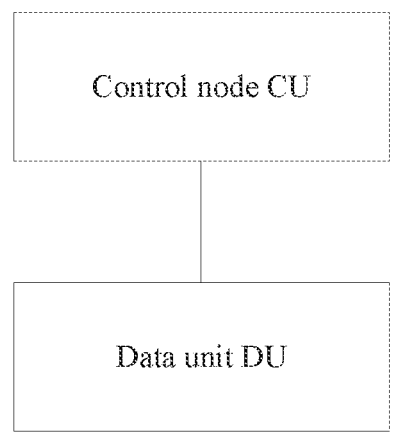
FIG. 2 is a schematic diagram of another application scenario of a technical solution according to an embodiment of this application.

Specifically, FIG. 2 is a schematic diagram of another application scenario of a technical solution according to an embodiment of this application. As shown in FIG. 2, in a CRAN architecture, separation of a CU from a DU is introduced, the DU may correspond to the first network node in FIG. 1, and the CU corresponds to the second network node in FIG. 1.

It should be understood that, the first network node and the second network node may be two physically or logically separated modules in an overall network architecture, or may be two logical network elements that are completely independent.

The CU has a radio resource control (Radio Resource Control, RRC) function or a partial RRC control function, and includes functions of all protocol layers of an existing base station or functions of some protocol layers, for example, includes only the RRC function or the partial RRC function, or includes the RRC function or a function of a service data adaptation protocol (Service Data Adaptation Protocol, SDAP) layer, or includes a function of an RRC/packet data convergence protocol (Packet Data Convergence Protocol, PDCP) layer, or includes a function of an RRC/PDCP layer and a partial function of a radio link layer control protocol (Radio Link Control, RLC) layer; or includes a function of an RRC/PDCP/media access control (Media Access Control, MAC) layer, and even a partial or entire function of a physical layer PHY. Any other possibilities are not excluded.

The DU has functions of all or some of protocol layers functions of an existing base station, that is, functional units of some protocol layers of RRC/SDAP/PDCP/RLC/MAC/PHY, for example, includes functions of protocol layers such as the PDCP/RLC/MAC/PHY, or includes functions of some protocol layers such as the RLC/MAC/PHY, or includes some functions of the RLC/MAC/PHY, or includes only an entire or partial function of the PHY. It should be noted that, the protocol layers mentioned herein may change, and all fall within the protection scope of this application.

It should be understood that, the technical solutions in the embodiments of this application may be applied to various communications systems, such as: a global system for mobile communications (Global System of Mobile Communication, GSM), a code division multiple access (Code Division Multiple Access, CDMA) system, a wideband code division multiple access (Wideband Code Division Multiple Access, WCDMA) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a future 5th-generation (5th-Generation, 5G) communications system, and a CRAN communication system.

It should be further understood that the network device in the embodiments of this application may be a device configured to communicate with a terminal device. For example, the network device may be a combination of a base transceiver station (Base Transceiver Station, BTS) and a base station controller (Base Station Controller, BSC) in a GSM system or CDMA, may be a NodeB (NodeB, NB) and a radio network controller (Radio Network Controller, RNC) in a WCDMA system, or may be an evolved NodeB (Evolutional Node B, eNB or eNodeB) in an LTE system. Alternatively, the network device may be a relay station, an access point, an in-vehicle device, a wearable device, an access network device in a future 5G network, for example, a next-generation base station, or an access network device in a future evolved public land mobile network (Public Land Mobile Network, PLMN).

Specifically, there is a scenario in which a radio network control node is separated from a base station in a UMTS system in a 3rd-generation mobile communications technology (3rd-Generation, 3G); there is a scenario in which a baseband module is separated from a radio frequency module in an LTE system, namely, a radio remote scenario; two different networks need to be interconnected in a data center (Data Center, DC) scenario; in a scenario including macro and micro base stations, there is an interface for interconnecting the macro and micro base stations; there is an LTE-Wi-Fi aggregation (LTE-Wifi Aggregation, LWA) scenario; there are various non-cell (non-cell) scenarios in a 5G system (a terminal can be freely and randomly handed over between various cells, and there is no definite boundary between the various cells), and one control node is connected to all cells or is connected to various transmission nodes in cells; there is a BBU separation scenario in a CRAN scenario; and in a CRAN virtualization scenario, some functions of a BBU are deployed in a centralized manner and virtualized, the other functions are separately deployed, and there is a possibility that the two parts are physically and separately deployed. It should be understood that, scenarios of coexistence of different systems/standards all fall within a scope to which this application is applicable.

The embodiments are described in this application with reference to a terminal device. The terminal device may be user equipment (User Equipment, UE), an access terminal, a subscriber unit, a subscriber station, a mobile station, a mobile console, a remote station, a remote terminal, a mobile device, a user terminal, a terminal, a wireless communication device, a user agent, a user apparatus. The access terminal may be a cellular phone, a cordless phone, a session initiation protocol (Session Initiation Protocol, SIP) phone, a wireless local loop (Wireless Local Loop, WLL) station, a personal digital assistant (personal digital assistant, PDA), a handheld device, or a computing device having a wireless communication function, another processing device connected to a wireless modem, an in-vehicle device, a wearable device, a terminal device in a future 5G network, a terminal device in a future evolved PLMN, or the like.

Figure 3:
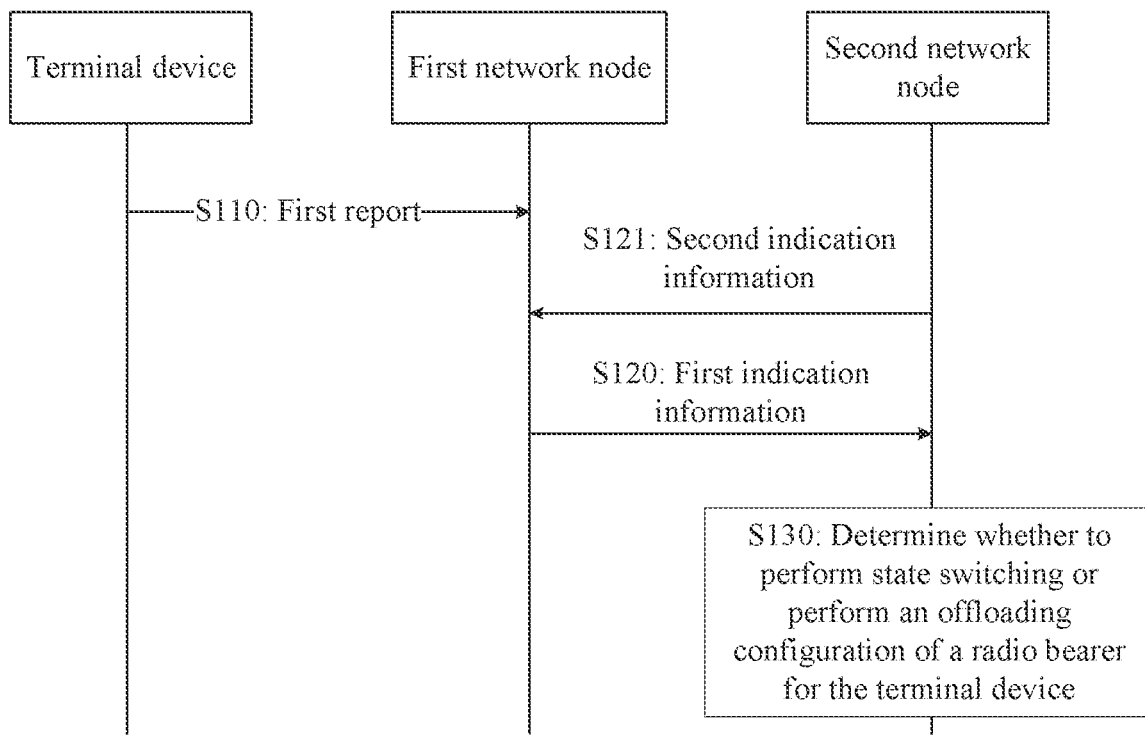
FIG. 3 is a schematic flowchart of a data transmission method according to an embodiment of this application.

FIG. 3 is a schematic flowchart of a data transmission method 100 according to an embodiment of this application. As shown in FIG. 3, the first network node may correspond to the DU in FIG. 2, and the second network node may correspond to the CU in FIG. 2. The method 100 includes the following steps.

S110: The first network node receives a first report from a terminal device, where the first report is used to indicate an uplink data volume of a buffer of the terminal device.

Optionally, the uplink data volume of the buffer of the terminal device includes at least one of a data volume of all radio bearers (Radio Bearer, RB) or a specified radio bearer used for uplink transmission of the terminal device, a data volume of all logical channels (Logical Channel, LCH) or a specified logical channel used for uplink transmission of the terminal device, a data volume of all logical channel groups or a specified logical channel group used for uplink transmission of the terminal device, or a data volume of all quality of service flows (Quality of Service, QoS) or a specified quality of service flow used for uplink transmission of the terminal device.

Optionally, the first network node includes at least one of a function of a radio link layer control protocol layer, a function of a media access control layer, and a function of a physical layer.

Optionally, the second network node includes at least one of a function of a packet data convergence protocol layer, a function of a service data adaptation layer, and a radio resource control function.

It should be understood that, the first report is a buffer status report BSR, a resource required for transmitting uplink data may be obtained by using the BSR, and the BSR is used to provide, to a network device, information about a volume of data in an uplink buffer of the terminal device that needs to be sent.

For example, the DU receives the BSR sent by the terminal device, the BSR indicates, to the DU, the data volume of the logical channel used for the uplink transmission of the terminal device, and based on the data volume of the logical channel, the DU may notify the CU of the data volume of the logical channel or notify the CU that the data volume of the logical channel is greater than a predefined data volume threshold.

It should be understood that, the first report may alternatively be information about the data volume of the buffer of the terminal device and MAC control information multiplexed by first information, and the first information may be a power headroom report (Power Headroom Report, PHR).

Optionally, the first indication information is further used to instruct the second network node to perform state switching or perform offloading configuration of a radio bearer for the terminal device.

S120: The first network node sends first indication information to the second network node, where the first indication information includes the uplink data volume of the buffer of the terminal device, or the first indication information is used to indicate a relationship between the uplink data volume of the buffer of the terminal device and a predefined data volume threshold.

It should be understood that, the first indication information is used to indicate the relationship between the uplink data volume of the buffer of the terminal device and the predefined data volume threshold, and the relationship between the uplink data volume of the buffer of the terminal device and the predefined data volume threshold may be that the uplink data volume of the buffer of the terminal device is greater than, less than, or equal to the predefined data volume threshold.

It should be further understood that, the first network node request, based on the received information about the uplink data volume of the buffer of the terminal device, the second network node to switch a state to an active state, perform carrier aggregation, or perform offloading configuration of a radio bearer for the terminal device.

For example, after receiving the first report sent by the terminal device, the DU determines that the uplink data volume of the buffer of the terminal device is greater than the predefined data volume threshold, the DU may send the first indication information to the CU. The first indication information is used to instruct the CU to perform state switching, perform carrier aggregation, or perform offloading configuration of a radio bearer for the terminal device.

Optionally, the method 100 further includes the following step:

S121: The second network node sends second indication information to the first network node, where the second indication information is used to indicate the predefined data volume threshold to the first network node, or the second indication information is used to instruct the first network node to send the information about the uplink data volume of the buffer of the terminal device to the second network node.

Specifically, after receiving the report sent by the terminal device, the first network node may process the report to learn of the uplink data volume of the buffer of the terminal device, and compare the uplink data volume of the buffer of the terminal device with the predefined data volume threshold. The predefined data volume threshold may be preconfigured by the second network node for the first network node.

Optionally, the second indication information is further used to indicate, to the first network node, a configuration of enabling or forbidding reporting of the information about the data volume. Specifically, the configuration may be a common configuration for the entire first network node, or a configuration for a specified terminal device, a specified bearer, a specified logical channel, or a specified data flow. For example, if the configuration is a common configuration, information about data volumes of all users is reported.

Optionally, if the first network node is not configured, the first network node reports information about a data volume of a specified service or a service at a specified QoS level by default.

It should be understood that, the first network node may report, to the second network node, a supported reporting capability of the type, so that the second network node configures the reporting function for the first network node.

For example, after receiving the BSR sent by the terminal device, the DU processes the BSR to learn of the uplink data volume of the buffer of the terminal device from the BSR; the DU compares the uplink data volume of the buffer of the terminal device with the predefined data volume threshold preconfigured by the CU; and if the uplink data volume of the buffer of the terminal device is greater than or equal to the predefined data volume threshold, the DU sends the first indication information to the CU; or if the uplink data volume of the buffer of the terminal device is less than the predefined data volume threshold, the DU does not send the first indication information to the CU.

It should be understood that, if the uplink data volume of the buffer of the terminal device is less than the predefined data volume threshold, the DU may alternatively postpone sending the first indication information to the CU.

It should be further understood that, the second network node may further instruct the first network node to configure a mode of reporting the first indication information to the second network node. The mode includes an event mode, a periodic mode, and a transparent transmission mode.

In event mode, a condition for reporting the first indication information may be, but is not limited to, one of the following:

(1) when a total data volume used for the uplink transmission of the terminal device exceeds the predefined data volume threshold;

(2) when the data volume of all the RBs or the specified RB used for the uplink transmission of the terminal device exceeds the predefined data volume threshold;

(3) when the data volume of all the logical channels or the specified logical channel or all the logical channel groups or the specified logical channel group used for the uplink transmission of the terminal device exceeds the predefined data volume threshold;

(4) when the data volume of all the QoS flows or the specified QoS flow used for the uplink transmission of the terminal device exceeds the predefined data volume threshold; or (5) when receiving uplink data information during a random access procedure performed by the terminal device or after random access is completed, the first network node reports the first indication information to the second network node.

A result reported by the first network node may be optionally greater than, equal to, or less than the predefined data volume threshold.

For a quantity of times that the first network node performs reporting, optionally, the quantity of times that reporting is performed is greater than or equal to 1.

It should be understood that, the quantity of times that reporting is performed may be configured by the second network node or may be agreed on in a protocol. This is not limited in this application.

In periodic mode, a reporting period may be configured for the first network node. For example, if the first network node does not receive a new report from the terminal device after previous reporting, the first network node sends a default value 0 to the second network node.

In event mode and periodic mode, the first network node may collect statistics on a sum of uplink data volumes of the buffer reported by the terminal device within a period of time, and then compare the sum with the predefined data volume threshold. For example, if the sum of uplink data volumes of the buffer reported by the terminal device exceeds the predefined data volume threshold, the first network node determines to send the first indication information to the second network node.

In transparent transmission mode, after receiving a report from the terminal device, the first network node may report the report to the second network node in one of the following manners, but this is not limited thereto:

(1) transparently transmitting the report to the second network node;

(2) extracting content from the report, and reporting original information to the second network node, where, for example, the original information is at least one data volume information of a total data volume used for the uplink transmission of the terminal device, the data volume of all the RBs or the specified RB, the data volume of all the LCHs or the specified LCH, the data volume of all the logical channel groups or the specified logical channel group, and the data volume of all the QoS flows or the specified QoS flow; or (3) extracting content from the report, and reporting, based on comparison with the predefined data volume threshold, a comparison result (for example, being greater than, equal to, or less than the predefined data volume threshold) to the second network node, where for example, the original information is at least one of a total data volume used for the uplink transmission of the terminal device, the data volume of all the RBs or the specified RB, the data volume of all the LCHs or the specified LCH, the data volume of all the logical channel groups or the specified logical channel group, and the data volume of all the QoS flows or the specified QoS flow, and the at least one data volume is greater than or less than the predefined data volume threshold.

S130: The second network node determines, according to the first indication message, whether to perform state switching or perform offloading configuration of a radio bearer for the terminal device.

Specifically, after the second network node receives the first indication information sent by the first network node, the second network node determines whether to perform the state switching or perform the offloading configuration of the radio bearer for the terminal device.

For example, after the CU receives the first indication information sent by the DU, if the first indication information indicates that the uplink data volume of the buffer of the terminal device is greater than the predefined data volume threshold, the CU sends a switching command to the terminal device. The switching command is used to instruct the terminal device to switch from an inactive state to the active state.

For another example, the CU does not configure the predefined data volume threshold for the DU, after the CU receives the first indication information sent by the DU, if the first indication information indicates the uplink data volume of the buffer of the terminal device, the CU may compare the uplink data volume of the buffer of the terminal device with the predefined data volume threshold, and if the uplink data volume of the buffer of the terminal device is greater than the predefined data volume threshold, the CU sends offloading configuration information of the radio bearer to the terminal device.

It should be understood that, in a 5th-generation mobile communications system, to support small data transmission and a power saving mode that is directly equivalent to an idle (IDLE) state, a third state (the inactive state) is introduced. The determining whether to perform state switching for the terminal device may be: determining, by the second network node, to switch the terminal device from the inactive state to the active state.

It should be further understood that, the offloading configuration of the radio bearer may be a configuration of carrier aggregation (Carrier Aggregation, CA) or radio bearer separation. The carrier aggregation means that data transmission is provided for the terminal device by using a plurality of cells, and the plurality of cells may be located in one network node or a plurality of network nodes. The radio bearer separation means that a plurality of cells provides data transmission on one bearer for the terminal device.

When a data volume is relatively large, a network instructs the terminal to enter the active state, and a dedicated resource is allocated to UE, so that the UE reports channel state indication information and an uplink channel quality measurement signal, and the network performs efficient scheduling and sending based on a channel condition.

According to the data transmission method in this embodiment of this application, when some functions of a network device are separated and serve as different network nodes, the network device can perceive change information of a data volume of a terminal device or a service in time. This prevents the terminal device from redesigning a buffer data volume change notification for the second network node.

Figure 4:
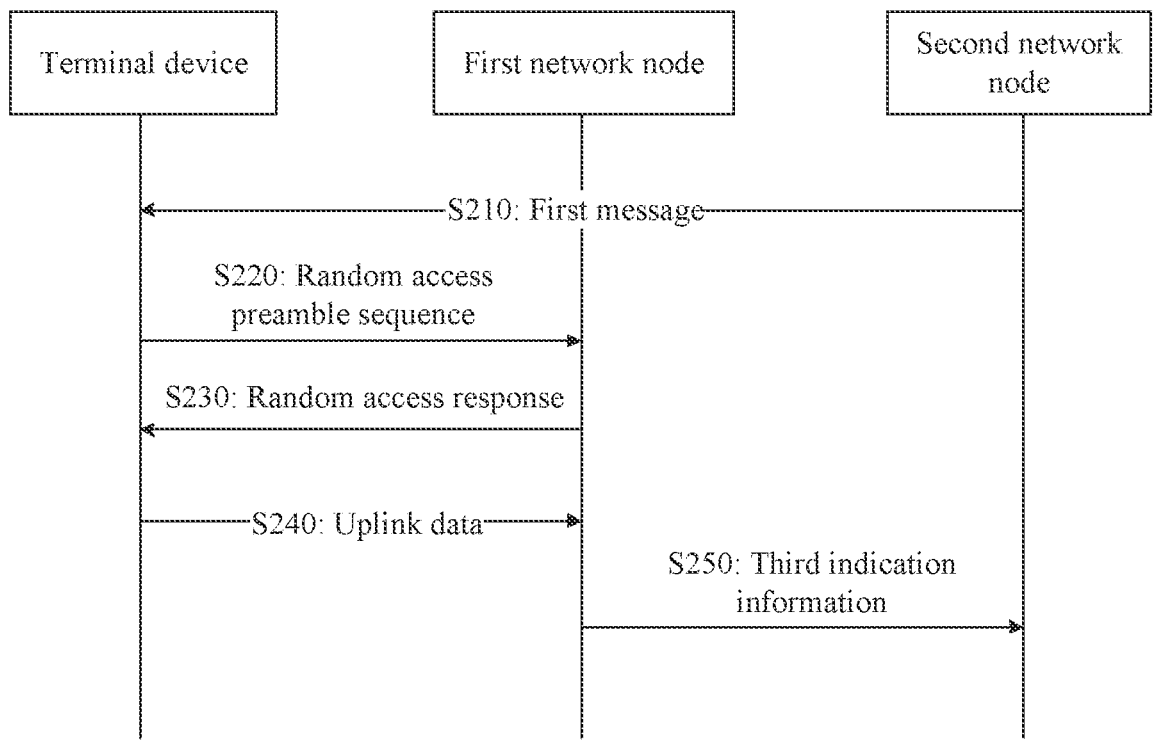
FIG. 4 is another schematic flowchart of a data transmission method according to an embodiment of this application.

FIG. 4 is another schematic flowchart of a data transmission method 200 according to an embodiment of this application. As shown in FIG. 4, the first network node may correspond to the DU in FIG. 2, and the second network node may correspond to the CU in FIG. 2. The method 200 includes the following steps.

S210: The second network node sends a first message, where the first message is used to instruct a terminal device to change a key, and the second network node includes at least one of a function of a packet data convergence protocol layer, a function of a service data adaptation layer, and a radio resource control function.

Optionally, the first message is an RRC message.

Specifically, the second network node may send the first message to the first network node. The first message is used to instruct the terminal device to change a key. The first network node includes at least one of a function of a radio link layer control protocol layer, a function of a media access control layer, and a function of a physical layer. The first network node may transparently transmit the first message to the terminal device. After receiving the first message, the terminal device deduces a new key, selects a random access slot, and sends a random access preamble sequence (preamble) to the first network node.

For example, the CU sends an RRC message to the DU. The RRC message is used to instruct the terminal device to change a key. After receiving the RRC message, the DU transparently transmits the RRC message to the terminal device, and the terminal device sends a preamble to the DU.

Optionally, if an uplink grant configuration parameter used by the terminal device to send data on an uplink is allocated in the first message, the terminal device may send data on the uplink grant by using a proper extended prefix format, without selecting a random access slot for sending the random access preamble sequence.

Figure 5:
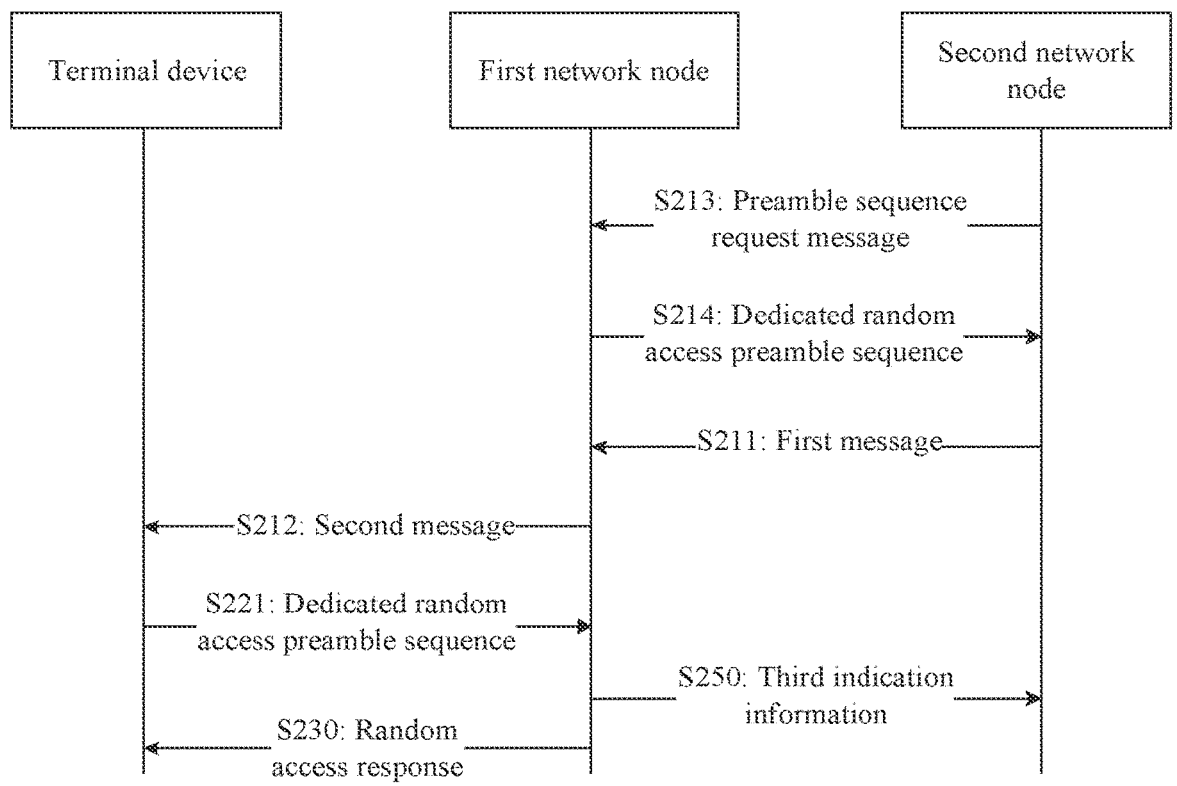
FIG. 5 is still another schematic flowchart of a data transmission method according to an embodiment of this application.

Optionally, FIG. 5 is still another schematic flowchart of the data transmission method 200 according to an embodiment of this application. As shown in FIG. 5, the method 200 further includes the following steps:

S211: The second network node sends a first message to the first network node, where the first message is used to instruct the terminal device to change a key.

S212: The first network node sends a second message to the terminal device, where the second message includes a dedicated random access preamble sequence of the terminal device.

Optionally, the first message includes the dedicated random access preamble sequence of the terminal device, or the second network node sends the first message and the dedicated random access preamble sequence of the terminal device to the first network node.

Specifically, the preamble is the dedicated random access preamble sequence of the terminal device, and the dedicated random access preamble sequence of the terminal device is managed by the second network node. The second network node sends the first message to the first network node, where the first message includes the dedicated random access preamble sequence of the terminal device; or the second network node sends the first message and the dedicated random access preamble sequence of the terminal device to the first network node. The first network node may transparently transmit the first message and the dedicated random access preamble sequence of the terminal device to the terminal device.

For example, the CU sends a first RRC message to the DU, where the first RRC message includes the dedicated random access preamble sequence of the terminal device, or the CU sends a first RRC message and the dedicated random access preamble sequence of the terminal device to the DU, where the first RRC message is used to instruct the terminal device to change a key. The DU may transparently transmit the first message and the dedicated random access preamble sequence of the terminal device to the terminal device.

It should be understood that, the first message and the second message may have same content.

It should be further understood that, the dedicated random access preamble sequence of the terminal device may be reserved by the second network node, or may be allocated by the first network node to the second network node.

Optionally, as shown in FIG. 5, the method 200 further includes the following steps:

S213: The first network node receives a preamble sequence request message sent by the second network node.

S214: The first network node sends the dedicated random access preamble sequence of the terminal device to the second network node based on the preamble sequence request message.

Specifically, the preamble is the dedicated random access preamble sequence of the terminal device, and the dedicated random access preamble sequence of the terminal device is managed by the first network node. The second network node sends the preamble sequence request message to the first network node, where the preamble sequence request message is used to request the dedicated random access preamble sequence of the terminal device from the first network node. The first network node sends the dedicated random access preamble sequence of the terminal device to the second network node based on the preamble sequence request message, and the second network node delivers the dedicated random access preamble sequence of the terminal device to the terminal device.

It should be understood that, the dedicated random access preamble sequence of the terminal device is managed by the first network node. The first message sent by the second network node to the first network node does not include the dedicated random access preamble sequence, and the first network node may add the dedicated random access preamble sequence to the sent second message, or the first network node may send the second message and the dedicated random access preamble sequence to the terminal device.

For example, the CU sends the first RRC message to the DU, where the first RRC message is used to instruct the terminal device to change a key. After receiving the first RRC message, the DU seconds a second RRC message to the terminal device, where the second RRC message includes the dedicated random access preamble sequence of the terminal device, or the DU sends a second RRC message and the dedicated random access preamble sequence of the terminal device to the terminal device, or before sending the first RRC message to the DU, the CU requests the DU to allocate the dedicated random access preamble sequence, the DU sends the dedicated random access preamble sequence to the CU, and the CU adds the dedicated random access preamble sequence to the first RRC message and sends the first RRC message to the terminal by using the DU.

Figure 6:
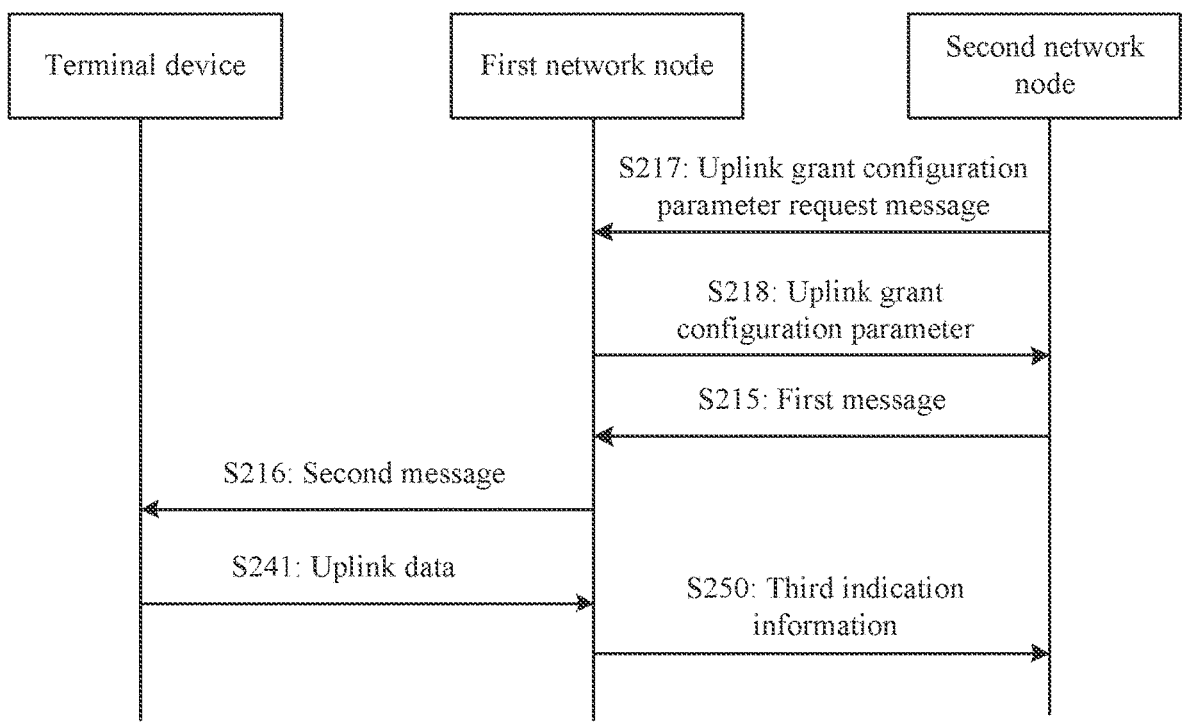
FIG. 6 is still another schematic flowchart of a data transmission method according to an embodiment of this application.

FIG. 6 is still another schematic flowchart of the data transmission method 200 according to an embodiment of this application. As shown in FIG. 6, the method 200 further includes the following steps:

S215: The second network node sends a first message to the first network node, where the first message is used to instruct the terminal device to change a key.

S216: The first network node sends a second message to the terminal device, where the second message includes an uplink grant configuration parameter used by the terminal device to send data.

Optionally, the first message includes the uplink grant configuration parameter of the terminal device, or the second network node sends the first message and the uplink grant configuration parameter to the first network node.

Specifically, the uplink grant configuration parameter is managed by the second network node. The second network node sends the first message to the first network node, where the first message includes the uplink grant configuration parameter of the terminal device, or the second network node sends the first message and the uplink grant configuration parameter to the first network node, where the first network node may transparently transmit the first message and the uplink grant configuration parameter to the terminal device.

It should be understood that, the first message and the second message may have same content.

For example, the CU sends the first RRC message to the DU, where the first RRC message includes the uplink grant configuration parameter of the terminal device, or the CU sends the first RRC message and the uplink grant configuration parameter of the terminal device to the DU, where the first RRC message is used to instruct the terminal device to change a key. The DU may transparently transmit the first message and the uplink grant configuration parameter of the terminal device to the terminal device.

It should be understood that, if an uplink grant configuration parameter used by the terminal device to send data on an uplink is allocated in the second message, the terminal device may send data on the uplink grant by using a proper extended prefix format, without selecting a random access slot for sending the random access preamble sequence.

It should be further understood that, the uplink grant configuration parameter of the terminal device that is used to send data may be reserved by the second network node, or may be actively allocated by the first network node to the second network node, or may be actively allocated by the first network node to the second network node when the second network node requests the uplink grant configuration parameter.

Optionally, as shown in FIG. 6, the method 200 further includes the following steps:

S217: The first network node receives an uplink grant configuration parameter request message sent by the second network node.

S218: The first network node sends the uplink grant configuration parameter to the second network node based on the uplink grant configuration parameter request message.

Specifically, the uplink grant configuration parameter is managed by the first network node. The second network node sends the uplink grant configuration parameter request message to the first network node, where the uplink grant configuration parameter request message is used to request the uplink grant configuration parameter of the terminal device from the first network node. The first network node sends the uplink grant configuration parameter of the terminal device to the second network node based on the uplink grant configuration parameter request message, and the second network node delivers the uplink grant configuration parameter of the terminal device to the terminal device.

It should be understood that, the uplink grant configuration parameter of the terminal device is managed by the first network node. The first message sent by the second network node to the first network node does not include the uplink grant configuration parameter, and the first network node may add the uplink grant configuration parameter to the sent second message, or the first network node may send the second message and the uplink grant configuration parameter to the terminal device. As shown in FIG. 6, the method 200 further includes the following step:

S241: The terminal device sends uplink data to the first network node on an uplink grant.

Optionally, as shown in FIG. 4, the method 200 further includes the following steps.

S220: The terminal device sends a random access preamble sequence to the first network node.

Specifically, as shown in FIG. 4, if the random access preamble sequence is not the dedicated random access preamble sequence of the terminal device, after receiving the random access preamble sequence, the first network node sends a random access response message to the terminal device, and allocates an uplink scheduling grant (UL grant) to the terminal device.

S230: The first network node sends a random access response to the terminal device.

S240: The first network node receives the uplink data sent by the terminal.

Specifically, after receiving the random access response message sent by the first network node, the terminal device sends the uplink data to the first network node, where the uplink data includes a key change response message.

Optionally, if the random access preamble sequence in S220 is not the random access preamble sequence of the terminal device, the uplink data includes identifier information of the terminal device.

Optionally, the identifier information of the terminal device is a cell radio network temporary identifier (C-RNTI) or context identifier information.

Optionally, as shown in FIG. 5, the random access preamble sequence is the dedicated random access preamble sequence of the terminal device, and the method 200 further includes the following step.

S221: The terminal device sends the dedicated random access preamble sequence of the terminal device to the first network node.

It should be understood that, as shown in FIG. 5, after the first network node receives the dedicated preamble of the terminal device, S240 of sending, by the terminal device, the uplink data to the first network node is optional, and in S250, the first network node sends third indication information to the second network node, where the third indication information indicates that the terminal device has performed a random access procedure. It is not excluded that the third indication information includes the dedicated preamble or the identifier information of the terminal device, and it is not excluded that the third indication information is transmitted by using a common transmission channel.

It should be further understood that, as shown in FIG. 6, if the terminal device receives the uplink grant configuration parameter in S216, after a new key is used for protection, the terminal device sends data on the allocated uplink grant, and S220 and S230 are optional.

S250: The first network node sends third indication information to the second network node, where the third indication information is used to indicate, to the second network node, that the uplink data is uplink data that is sent in a random access procedure or after a random access procedure or on the uplink grant, or the third indication information is used to indicate, to the second network node, that the terminal device has performed a random access procedure, and the second network node includes at least one of a function of a packet data convergence protocol layer, a function of a service data adaptation layer, and a radio resource control function.

Optionally, the uplink data sent on the uplink grant is uplink data sent on an uplink grant allocated in the first message.

It should be understood that, the third indication information may be control signaling information, or may be indication information carried in user plane data.

It should be further understood that, if the terminal device sends the dedicated random access preamble sequence of the terminal device to the first network node, the third indication information is used to indicate, to the second network node, that the terminal device has performed the random access procedure.

For example, after receiving the dedicated preamble or receiving the data on the uplink grant or receiving MSG3 data, the first network node notifies the second network node that the terminal device has already switched to a new key, or indicates that the terminal device has already used a random access procedure, to implicitly indicate that the terminal device has already switched to a new key.

Specifically, after receiving the uplink data sent by the terminal device, the first network node indicates, to the second network node in an explicit or implicit manner, that the uplink data is uplink data that is sent in the random access procedure or after the random access procedure by using a semi-statically allocated uplink grant, and the uplink data is data protected by using the new key. In other words, the first network node indicates, in an explicit or implicit manner, that the terminal device has performed the random access, is performing the random access, or performs no random access, to send and transform data protected by using different keys, and the second network node may learn that the terminal device has already completely deduced the new key, and has performed sending by using the new key.

Optionally, the first network node sends the third indication information to the second network node on a dedicated bearer, where the dedicated bearer is a dedicated bearer between the first network node and the second network node that corresponds to the terminal device.

For example, the DU sends the third indication information on a dedicated bearer between the CU and the DU, explicitly indicates that the terminal device uses the random access procedure, and then sends the uplink data.

Optionally, the first network node sends the third indication information to the second network node on a common channel, where the common channel is a channel between the first network node and the second network node that is used by the terminal device to send the uplink data in the random access procedure.

For example, the DU sends the identifier information and/or the uplink data of the terminal device to the CU on a channel between the CU and the DU that is used to transmit the uplink data sent by the terminal device in the random access procedure, and the CU determines, by using the channel, that the terminal device has performed the random access procedure.

It should be understood that, after receiving the dedicated random access preamble sequence, the first network node may directly send the third indication information to the second network node in an explicit or implicit manner, and send a random access response message to the terminal device. In the explicit manner, the third indication information indicates that the terminal device sends data through random access or by using a preconfigured uplink grant. In the implicit manner, the third indication information is sent on a common transmission tunnel used to send uplink information received in the random access procedure, and indicates that the terminal device has performed the random access procedure.

It should be further understood that, if the random access preamble sequence is not the dedicated random access preamble sequence of the terminal device, the third indication information includes the identifier information of the terminal device.

It should be further understood that, the identifier information is the cell radio network temporary identifier or the context identifier information of the terminal device.

According to the data transmission method in this embodiment of this application, when some functions of a network device are separated and serve as different network nodes, the second network node can perceive, in time, that a terminal device has performed a random access procedure, and the second network node can implicitly perceive that a key of the terminal device has already been changed completely.

Figure 7:
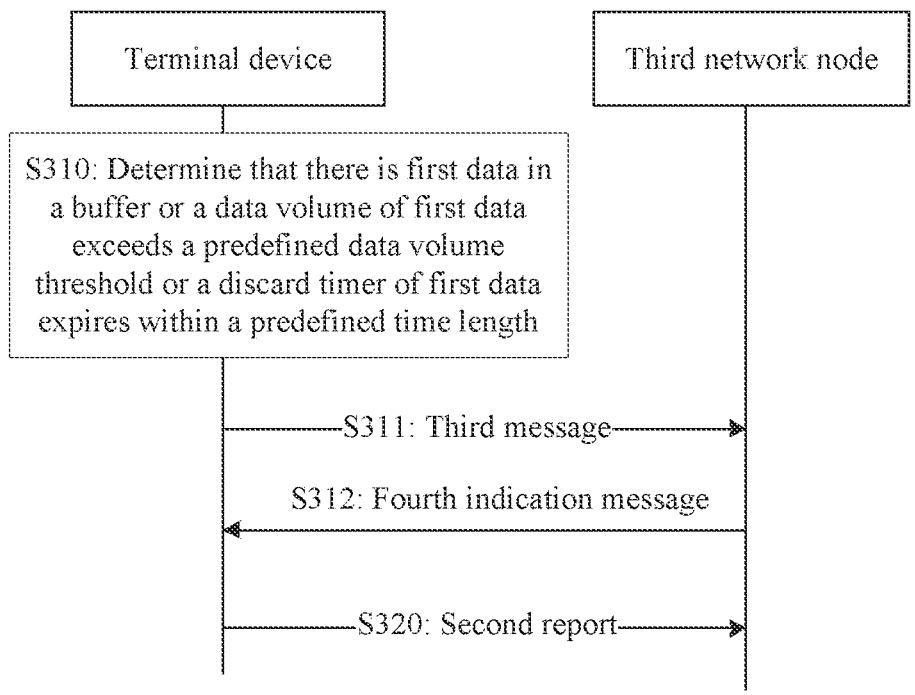
FIG. 7 is still another schematic flowchart of a data transmission method according to an embodiment of this application.

FIG. 7 is still another schematic flowchart of a data transmission method 300 according to an embodiment of this application. As shown in FIG. 7, the first network node may correspond to the DU in FIG. 2, and the second network node may correspond to the CU in FIG. 2. The method 300 includes the following steps:

S310: A terminal device determines that there is first data in a buffer of the terminal device or a data volume of first data exceeds a predefined data volume threshold or a discard timer of first data expires within a predefined time length.

S320: The terminal device triggers a second report, where the second report is used to indicate that the first data in the buffer of the terminal device needs to be sent.

Specifically, if there is important data in the buffer of the terminal device or a data volume of important data exceeds the predefined data volume threshold or a discard timer of important data expires within the predefined time length, the terminal device triggers the second report, where the second report is used to indicate that the important data in the buffer of the terminal device needs to be sent.

For example, when a length of a PDCP discard timer of the first data is configured as 150 ms, and the first data has waited for 100 ms in a PDCP buffer and expires after 50 ms (the predefined time length), UE considers that a report of the first data can be triggered.

For another example, when the data volume of the first data exceeds 200 bytes (the predefined data volume threshold), UE considers that a report of the first data can be triggered.

It should be understood that, a retransmission timer may be started after the second report is sent. After the timer expires, if the terminal device determines that there is the first data in the buffer of the terminal device, the second report may be triggered again.

It should be further understood that, if the second report supports periodic triggering, a periodic timer may be started after the triggering, and after the timer expires, if the terminal device determines that there is the first data in the buffer of the terminal device, the second report may be triggered again.

Optionally, the predefined time length and the predefined data volume threshold may both be configured in a network or agreed on in a protocol.

Optionally, before the triggering, by the terminal device, a second report, the method 300 further includes the following step:

S311: The terminal device sends a third message to a third network node, where the third message is used to indicate that the terminal device supports a mode of triggering the second report.

It should be understood that, the third message may be used to indicate that the terminal device supports a mode of triggering the second report by using a specified logical channel or bearer.

A mode of triggering the second report by the terminal device may be, but is not limited to, one of the following:

(1) if the indicated logical channel or bearer changes from having no important data to having important data;

(2) if the indicated logical channel or bearer has important data and the discard timer (discard timer) is to expire within the predefined time length, for example, 50 ms;

(3) if a data volume of important data on the indicated logical channel or bearer exceeds the predefined data volume threshold; or (4) if important data is completely sent on the indicated logical channel or bearer.

For example, the terminal device determines that there is a data packet of an I frame of a real-time video in the buffer of the terminal device or the data packet of the I frame exceeds the predefined data volume threshold or a discard timer of the data packet of the I frame expires within the predefined time length, the terminal device sends a BSR to the third network node, where the BSR is used to indicate that the data packet of the I frame of the real-time video in the buffer of the terminal device needs to be sent.

Optionally, before the triggering, by the terminal device, a second report, the method 300 further includes the following step:

S312: The terminal device receives a fourth indication message sent by the third network node, where the fourth indication message is used to instruct the terminal device to trigger the second report on a specified logical channel or bearer.

For example, the third network node instructs the terminal device to trigger the mode on the specified bearer or logical channel. For example, for a bearer having a QCI=2, the terminal device can trigger only reporting indication information of the important data on the bearer.

For another example, it is agreed on in a protocol that reporting indication information of the important data can be triggered on only a bearer having a QCI=2.

It should be understood that, only the important data (the first data) being the data packet of the I frame of the real-time video is described above, and the important data is not limited thereto. For example, the important data may alternatively be a data packet of an associated bidirectional P frame. The important data is not limited in this application.

Optionally, the terminal device may trigger the second report in one of the following manners, but this is not limited thereto:

(1) a bit of a MAC BSR subheader indicates that there is important data/there is no important data;

(2) in an implementation in replacement of MAC BSR reporting, a new media access control control element (MAC CE) is introduced, the MAC CE is a media access control service data unit (MAC SDU) of 0 bytes, and a special LCH ID indicates the important data in a MAC subheader; or (3) in another implementation in replacement of MAC BSR reporting, a new MAC CE is introduced, a special LCH ID indicates the important data in a MAC subheader, the MAC CE is a MAC SDU of 1 byte, and the MAC SDU indicates a volume of the important data or a data volume threshold.

Optionally, the third network node includes at least one of a function of a radio resource control protocol layer, a function of a packet data convergence protocol layer, a function of a radio link layer control protocol layer, a function of a media access control layer, and a function of a physical layer.

It should be understood that, in a possible implementation, a network instructs the terminal device to receive the fourth indication message sent by the third network node, where the fourth indication message is used to instruct the terminal device to trigger the second report.

It should be understood that, in a possible implementation, the terminal device reports capability information for supporting triggering of the second report, and a network determines, based on a capability of the terminal device, to instruct to enable the triggering function.

It should be understood that, the third network node may be a base station, or may be the DU in an architecture including the CU and the DU. The third network node is not limited in this application.

According to the data transmission method in this embodiment of this application, when there is important data in the buffer of the terminal device, a network device can be notified in time.

The data transmission methods according to the embodiments of this application are described in detail above with reference to FIG. 1 to FIG. 7. A network device and a terminal device according to embodiments of this application are described in detail below with reference to FIG. 8 to FIG. 27.

Figure 8:
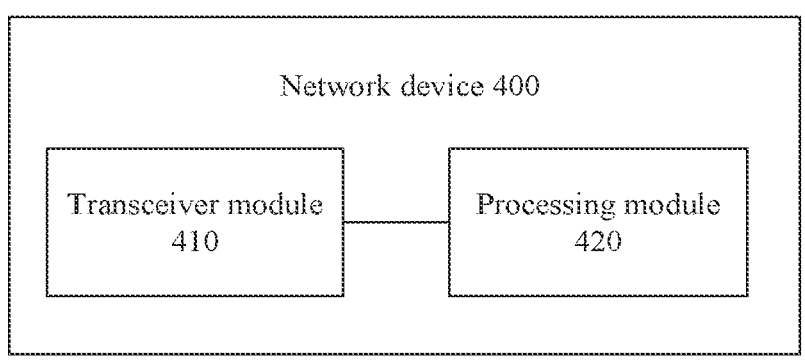
FIG. 8 is a schematic block diagram of a network device according to an embodiment of this application.

FIG. 8 is a schematic block diagram of a network device 400 according to an embodiment of this application. As shown in FIG. 8, the network device 400 includes:

a transceiver module 410, configured to receive a first report from a terminal device, where the first report is used to indicate an uplink data volume of a buffer of the terminal device; and a processing module 420, configured to generate first indication information, where the first indication information includes the uplink data volume of the buffer of the terminal device, or the first indication information is used to indicate a relationship between the uplink data volume of the buffer of the terminal device and a predefined data volume threshold, where the transceiver module 410 is further configured to send the first indication information to a second network node.

Optionally, the first report is a buffer status report BSR.

In some possible implementations, the first report is the information of the data volume of the buffer of the terminal device and MAC control information multiplexed by first information, and the first information may be a power headroom report.

In some possible implementations, the first indication information is further used to instruct the second network node to perform state switching or perform offloading configuration of a radio bearer for the terminal device.

Optionally, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

Optionally, the transceiver module 410 is further configured to receive second indication information sent by the second network node, where the second indication information is used to indicate the predefined data volume threshold or the uplink data volume to the first network node; and the transceiver module 410 is specifically configured to send the first indication information to the second network node based on the predefined data volume threshold or the uplink data volume.

Optionally, if the uplink data volume of the buffer of the terminal device is greater than or equal to the predefined data volume threshold, the transceiver module 410 sends the first indication information to the second network node.

Optionally, the network device includes at least one of a function of a radio link layer control protocol layer, a function of a media access control layer, and a function of a physical layer; and/or the second network node includes at least one of a function of a packet data convergence protocol layer, a function of a service data adaptation layer, and a radio resource control function.

Optionally, the second indication information is used to instruct the first network node to enable reporting of the first indication information; and the transceiver module 410 is specifically configured to send the first indication information to the second network node according to the second indication information.

When some functions of the network device in this embodiment of this application are separated and serve as different network nodes, the network device can perceive change information of a data volume of a terminal device or a service in time. This prevents the terminal device from redesigning a buffer data volume change notification for the second network node.

Figure 9:
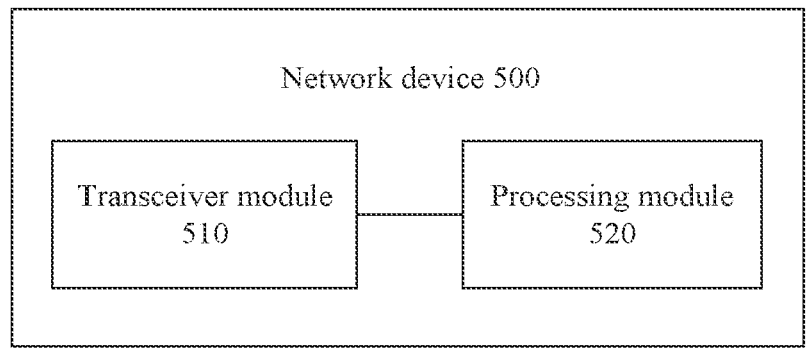
FIG. 9 is another schematic block diagram of a network device according to an embodiment of this application.

FIG. 9 is a schematic block diagram of a network device 500 according to an embodiment of this application. As shown in FIG. 9, the network device 500 includes:

a transceiver module 510, configured to receive a first indication message sent by a first network node, where the first indication message is used to indicate an uplink data volume of a buffer of the terminal device to the second network node, or the first indication information is used to indicate a relationship between an uplink data volume of a buffer of the terminal device and a predefined data volume threshold; and a processing module 520, configured to determine, according to the first indication message, whether to perform state switching or perform offloading configuration of a radio bearer for the terminal device.

Optionally, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

Optionally, the transceiver module 510 is further configured to send second indication information to the first network node, where the second indication information is used to indicate the predefined data volume threshold or the uplink data volume to the first network node.

Optionally, the second indication information is further used to instruct the first network node to send the first indication information to the second network node if the uplink data volume of the buffer of the terminal device is greater than or equal to the predefined data volume threshold.

Optionally, the state switching includes switching from an inactive state to an active state.

Optionally, the first network node includes at least one of a function of a radio link layer control protocol layer, a function of a media access control layer, and a function of a physical layer; and/or the network device includes at least one of a function of a packet data convergence protocol layer, a function of a service data adaptation layer, and a radio resource control function.

Optionally, the second indication information is used to instruct the first network node to enable reporting of the information about the data volume.

Optionally, the second indication information is used to instruct the first network node to enable reporting of the information about the data volume for a specified terminal device, a specified bearer, or a specified logical channel.

Figure 10:
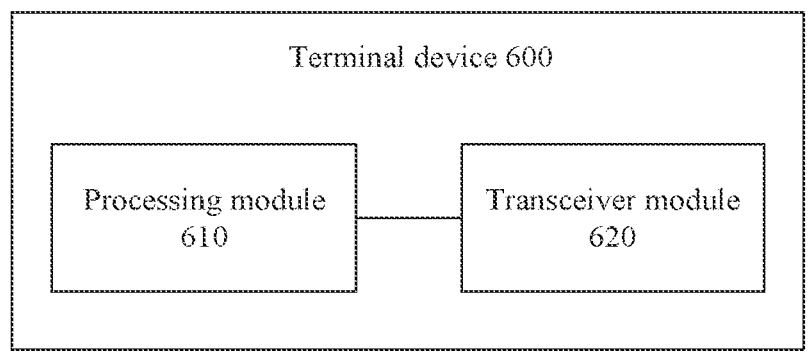
FIG. 10 is a schematic block diagram of a terminal device according to an embodiment of this application.

FIG. 10 is a schematic block diagram of a terminal device 600 according to an embodiment of this application. As shown in FIG. 10, the terminal device 600 includes:

a processing module 610, configured to generate a first report, where the first report is used to indicate an uplink data volume of a buffer of the terminal device; and a transceiver module 620, configured to send the first report to a first network node, where the transceiver module is further configured to receive indication information sent by a second network node, where the indication information is used to determine whether to perform state switching or perform offloading configuration of a radio bearer for the terminal device.

Optionally, the first report is a buffer status report BSR.

Optionally, the first report is the information of the data volume of the buffer of the terminal device and MAC control information multiplexed by first information, and the first information may be a power headroom report.

Optionally, the first indication information is further used to instruct the second network node to perform state switching or perform offloading configuration of a radio bearer for the terminal device.

Optionally, the uplink data volume of the buffer of the terminal device includes at least one of a data volume of all radio bearers or a specified radio bearer used for uplink transmission of the terminal device, a data volume of all logical channels or a specified logical channel used for uplink transmission of the terminal device, a data volume of all logical channel groups or a specified logical channel group used for uplink transmission of the terminal device, or a data volume of all quality of service flows or a specified quality of service flow used for uplink transmission of the terminal device.

Optionally, the first network node includes at least one of a function of a radio link layer control protocol layer, a function of a media access control layer, and a function of a physical layer; and/or the second network node includes at least one of a function of a packet data convergence protocol layer, a function of a service data adaptation layer, and a radio resource control function.

Figure 11:
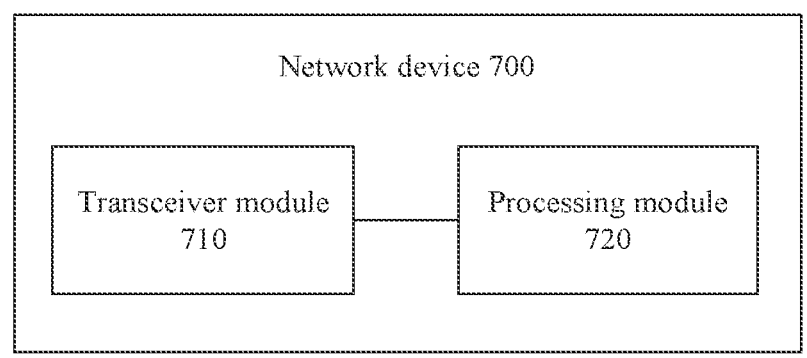
FIG. 11 is still another schematic block diagram of a network device according to an embodiment of this application.

FIG. 11 is a schematic block diagram of a network device 700 according to an embodiment of this application. As shown in FIG. 11, the network device 700 includes:

a transceiver module 710, configured to receive uplink data sent by a terminal, where the network device includes at least one of a function of a radio link layer control protocol layer, a function of a media access control layer, and a function of a physical layer; and a processing module 720, configured to generate third indication information, where the third indication information is used to indicate, to the second network node, that the uplink data is uplink data that is sent in a random access procedure or after random access or uplink data that is sent on an uplink grant, where the transceiver module 710 is further configured to send the third indication information to the second network node, where the second network node includes at least one of a function of a packet data convergence protocol layer, a function of a service data adaptation layer, and a radio resource control function.

Optionally, the transceiver module 710 is further configured to: receive a random access preamble sequence sent by the terminal device; and send a random access response to the terminal device.

Optionally, the transceiver module 710 is specifically configured to receive, on the uplink grant, the uplink data sent by the terminal device.

Optionally, the transceiver module 710 is specifically configured to send the third indication information to the second network node on a dedicated bearer, where the dedicated bearer is a dedicated bearer between the first network node and the second network node that corresponds to the terminal device.

Optionally, the transceiver module 710 is specifically configured to send the third indication information to the second network node on a common channel, where the common channel is a channel between the first network node and the second network node that is used by the terminal device to send the uplink data in the random access procedure.

Optionally, the third indication information includes identifier information of the terminal device.

Optionally, the transceiver module 710 is further configured to send an uplink grant configuration parameter of the terminal device to the terminal device.

Optionally, the transceiver module 710 is further configured to receive an uplink grant configuration parameter request message sent by the second network node; and the processing module 720 is further configured to control, based on the uplink grant configuration parameter request message, the transceiver module 710 to send the uplink grant configuration parameter to the second network node.

Optionally, the transceiver module 710 is further configured to receive the uplink grant configuration parameter sent by the second network node.

Optionally, the identifier information is a cell radio network temporary identifier or context identifier information of the terminal device.

According to the network device in this embodiment of this application, when some functions of the network device are separated and serve as different network nodes, the second network node can perceive, in time, that a terminal device has performed a random access procedure, and the second network node can implicitly perceive that a key of the terminal device has already been changed completely.

Figure 12:
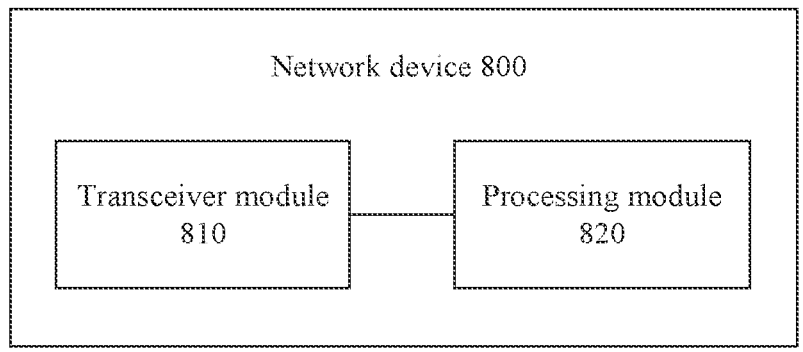
FIG. 12 is still another schematic block diagram of a network device according to an embodiment of this application.

FIG. 12 is a schematic block diagram of a network device 800 according to an embodiment of this application. As shown in FIG. 12, the network device 800 includes:

a transceiver module 810, configured to receive a dedicated random access preamble sequence sent by the terminal, where the network device includes at least one of a function of a radio link layer control protocol layer, a function of a media access control layer, and a function of a physical layer; and a processing module 820, configured to generate third indication information, where the third indication information is used to indicate, to the second network node, that the terminal device has performed a random access procedure, where the transceiver module 810 is further configured to send the third indication information to the second network node, where the second network node includes at least one of a function of a packet data convergence protocol layer, a function of a service data adaptation layer, and a radio resource control function.

Optionally, the transceiver module 810 is specifically configured to send the third indication information to the second network node on a dedicated bearer, where the dedicated bearer is a dedicated bearer between the first network node and the second network node that corresponds to the terminal device.

Optionally, the transceiver module 810 is specifically configured to send the third indication information to the second network node on a common channel, where the common channel is a channel between the first network node and the second network node that is used by the terminal device to send the uplink data in the random access procedure.

Optionally, the third indication information includes the dedicated random access preamble sequence or identifier information of the terminal device.

Optionally, the transceiver module 810 is further configured to send the dedicated random access preamble sequence to the terminal device.

Optionally, the transceiver module 810 is further configured to receive a preamble sequence request message sent by the second network node; and the processing module 820 is further configured to control, based on the preamble sequence request message, the transceiver module 810 to send the dedicated random access preamble sequence to the second network node.

Optionally, the transceiver module 810 is further configured to receive the dedicated random access preamble sequence sent by the second network node.

Optionally, the identifier information is a cell radio network temporary identifier or context identifier information of the terminal device.

According to the network device in this embodiment of this application, when some functions of the network device are separated and serve as different network nodes, the second network node can perceive, in time, that a terminal device has performed a random access procedure, and the second network node can implicitly perceive that a key of the terminal device has already been changed completely.

Figure 13:
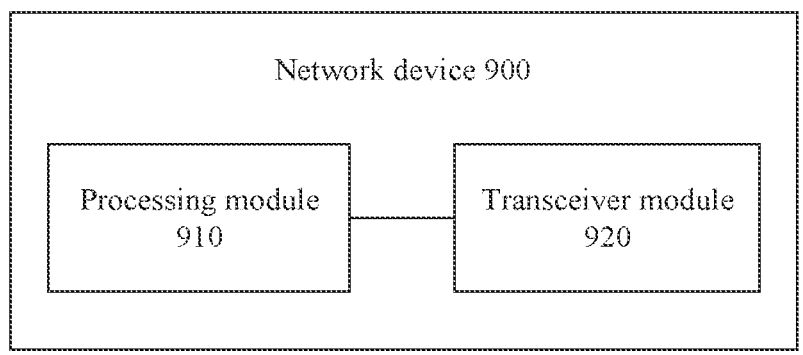
FIG. 13 is still another schematic block diagram of a network device according to an embodiment of this application.

FIG. 13 is a schematic block diagram of a network device 900 according to an embodiment of this application. As shown in FIG. 13, the network device 900 includes:

a processing module 910, configured to generate a first message, where the first message is used to instruct a terminal device to change a key; and a transceiver module 920, configured to send the first message, where the network device includes at least one of a function of a packet data convergence protocol layer, a function of a service data adaptation layer, and a radio resource control function, where the transceiver module 920 is further configured to receive third indication information sent by the first network node, where the third indication information is used to indicate, to the second network node, that uplink data received by the first network node is uplink data that is sent in a random access procedure or after a random access procedure or uplink data sent on an uplink grant, or the third indication information is used to indicate, to the second network node, that the terminal device has performed a random access procedure, and the first network node includes at least one of a function of a radio link layer control protocol layer, a function of a media access control layer, and a function of a physical layer.

Optionally, the first message includes a dedicated random access preamble sequence of the terminal device or an uplink grant configuration parameter used to send data.

Optionally, the transceiver module 920 is specifically configured to receive, on a dedicated bearer, the third indication information sent by the second network node, where the dedicated bearer is a dedicated bearer between the first network node and the second network node that corresponds to the terminal device.

Optionally, the transceiver module 920 is specifically configured to receive, on a common channel, the third indication information sent by the second network node, where the common channel is a channel between the first network node and the second network node that is used by the terminal device to send the uplink data in the random access procedure.

Optionally, the third indication information includes the dedicated random access preamble sequence of the terminal device or identifier information of the terminal device.

Optionally, the transceiver module 920 is further configured to send a preamble sequence request message or an uplink grant configuration parameter request message to the first network node; and the second network node receives the dedicated random access preamble sequence sent by the first network node or an uplink grant configuration parameter used to send data.

Optionally, the transceiver module 920 is further configured to send, to the first network node, the dedicated random access preamble sequence or the uplink grant configuration parameter used to send data.

Optionally, the identifier information is a cell radio network temporary identifier or context identifier information of the terminal device.

Figure 14:
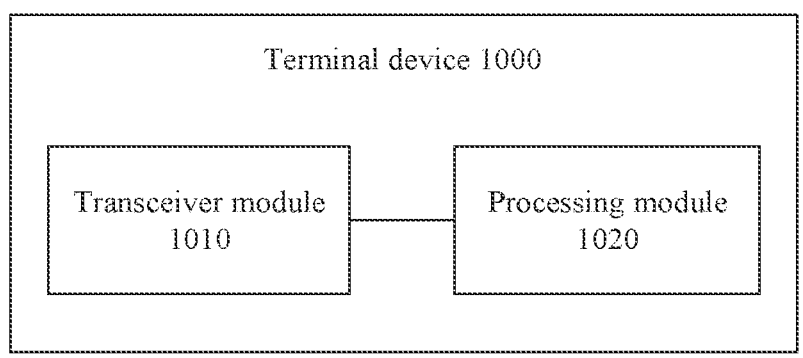
FIG. 14 is another schematic block diagram of a terminal device according to an embodiment of this application.

FIG. 14 is a schematic block diagram of a terminal device 1000 according to an embodiment of this application. As shown in FIG. 14, the terminal device 1000 includes:

a transceiver module 1010, configured to receive a first message from a second network node, where the first message is used to instruct the terminal device to change a key, and the second network node includes at least one of a function of a packet data convergence protocol layer, a function of a service data adaptation layer, and a radio resource control function; and a processing module 1020, configured to control the transceiver module to be further configured to send uplink data to a first network node, where the first network node includes at least one of a function of a radio link layer control protocol layer, a function of a media access control layer, and a function of a physical layer.

Optionally, the transceiver module 1010 is further configured to: send a random access preamble sequence to the first network node; and receive a random access response sent by the first network node.

Optionally, the transceiver module 1010 is further configured to receive an uplink grant configuration parameter; and the transceiver module 1010 is specifically configured to send the uplink data to the first network node on an uplink grant.

Optionally, the first message includes the uplink grant configuration parameter of the terminal device.

Optionally, the uplink data includes identifier information of the terminal device.

Optionally, the identifier information is a cell radio network temporary identifier or context identifier information of the terminal device.

Optionally, the transceiver module 1010 is further configured to receive the dedicated random access preamble sequence sent by the first network node or an uplink grant configuration parameter used to send data.

Figure 15:
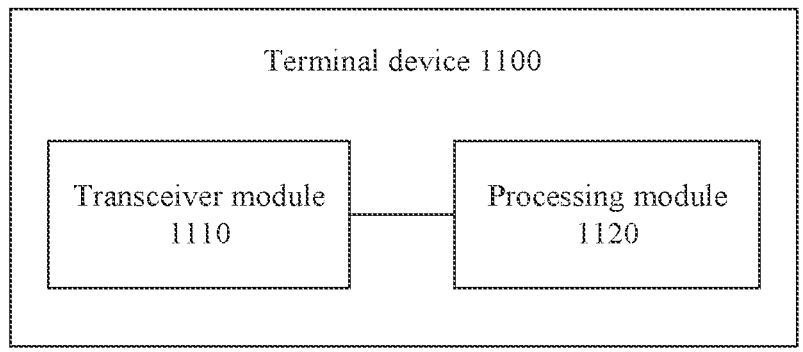
FIG. 15 is still another schematic block diagram of a terminal device according to an embodiment of this application.

FIG. 15 is a schematic block diagram of a terminal device 1100 according to an embodiment of this application. As shown in FIG. 15, the terminal device 1100 includes:

a transceiver module 1110, configured to receive a first message from a second network node, where the first message is used to instruct the terminal device to change a key, and the second network node includes at least one of a function of a packet data convergence protocol layer, a function of a service data adaptation layer, and a radio resource control function; and a processing module 1120, configured to control the transceiver module to further configured to send a dedicated random access preamble sequence of the terminal device to a first network node, where the first network node includes at least one of a function of a radio link layer control protocol layer, a function of a media access control layer, and a function of a physical layer.

Optionally, the first message includes the dedicated random access preamble sequence of the terminal device.

Optionally, the transceiver module 1110 is further configured to receive the dedicated random access preamble sequence of the terminal device sent by the first network node.

Figure 16:
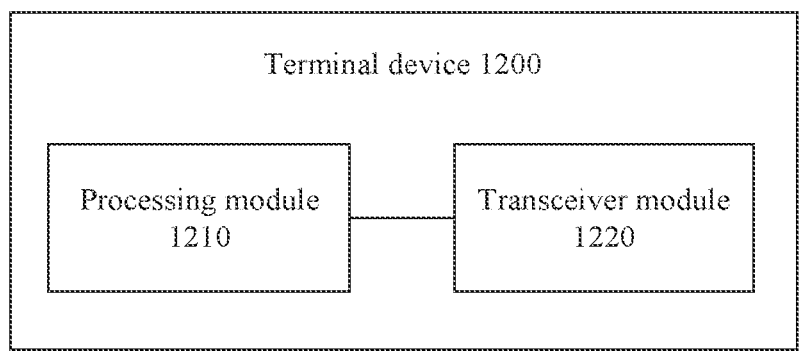
FIG. 16 is still another schematic block diagram of a terminal device according to an embodiment of this application.

FIG. 16 is a schematic block diagram of a terminal device 1200 according to an embodiment of this application. As shown in FIG. 16, the terminal device 1200 includes:

a processing module 1210, configured to determine that there is first data in a buffer of the terminal device or a data volume of first data exceeds a predefined data volume threshold or a discard timer of first data expires within a predefined time length; and a transceiver module 1220, configured to trigger a second report, where the second report is used to indicate that the first data in the buffer of the terminal device needs to be sent.

Optionally, the transceiver module 1220 is further configured to receive fourth indication information sent by a third network node, where the fourth indication information is used to instruct the terminal device to send the data report on a specified logical channel or bearer.

Optionally, the third network node includes at least one of a function of a radio resource control protocol layer, a function of a packet data convergence protocol layer, a function of a radio link layer control protocol layer, a function of a media access control layer, and a function of a physical layer.

Optionally, the first data is data considered to be relatively important on a bearer. For example, an I frame or a bidirectional P frame in video frames is data more important than a unidirectional P frame. It is not excluded that definition of importance may be agreed on by an operator or an application provider and a user. This is not limited herein.

According to the terminal device in this embodiment of this application, when there is the important data in the buffer of the terminal device, a network device can be notified in time.

Figure 17:
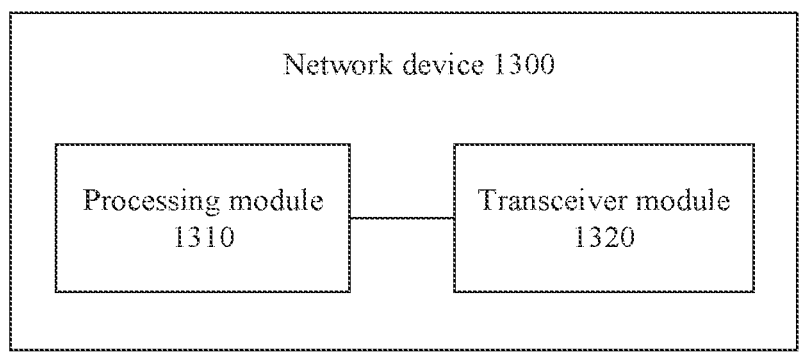
FIG. 17 is still another schematic block diagram of a network device according to an embodiment of this application.

FIG. 17 is a schematic block diagram of a network device 1300 according to an embodiment of this application. As shown in FIG. 17, the network device 1300 includes:

a processing module 1310, configured to generate fourth indication information, where the fourth indication information is used to instruct the terminal device to send a second report on a specified logical channel or bearer, and the second report is used to indicate that the first data in a buffer of the terminal device needs to be sent; and a transceiver module 1320, configured to send fourth indication information to the terminal device, where the transceiver module 1320 is further configured to receive the second report on the specified logical channel or bearer.

Optionally, the third network node includes at least one of a function of a radio resource control protocol layer, a function of a packet data convergence protocol layer, a function of a radio link layer control protocol layer, a function of a media access control layer, and a function of a physical layer.

Optionally, the first data is data considered to be relatively important on a bearer. For example, an I frame or a bidirectional P frame in video frames is data more important than a unidirectional P frame. It is not excluded that definition of importance may be agreed on by an operator or an application provider and a user. This is not limited herein.

Figure 18:
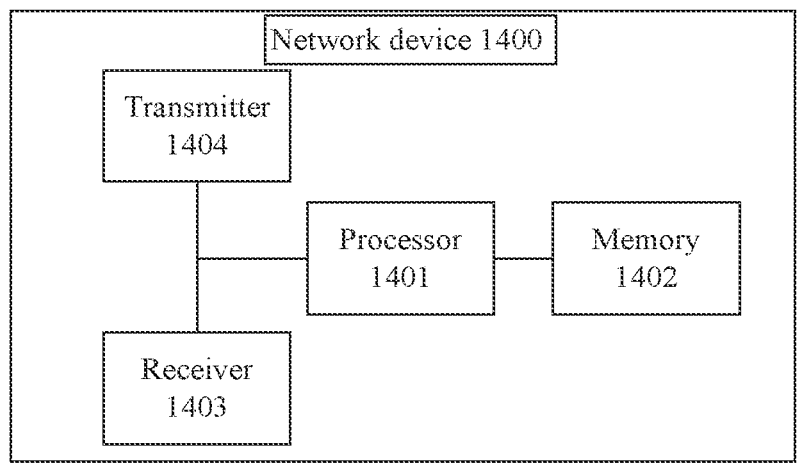
FIG. 18 is still another schematic block diagram of a network device according to an embodiment of this application.

FIG. 18 is a schematic structural diagram of a network device 1400 according to an embodiment of this application. As shown in FIG. 18, the network device 1400 includes a processor 1401, a memory 1402, a receiver 1403, and a transmitter 1404. These components communicate with and are connected to each other. The memory 1402 is configured to store an instruction. The processor 1401 is configured to: execute the instruction stored in the memory 1402, control the receiver 1403 to receive information, and control the transmitter 1404 to send information.

The processor 1401 is configured to execute the instruction stored in the memory 1402, the processor 1401 may be configured to perform a corresponding operation and/or function of the processing module 420 in the network device 400, and the receiver 1403 and the transmitter 1404 may be configured to perform a corresponding operation and/or function of the transceiver module 410 in the network device 400. For brevity, details are not described herein again.

Figure 19:
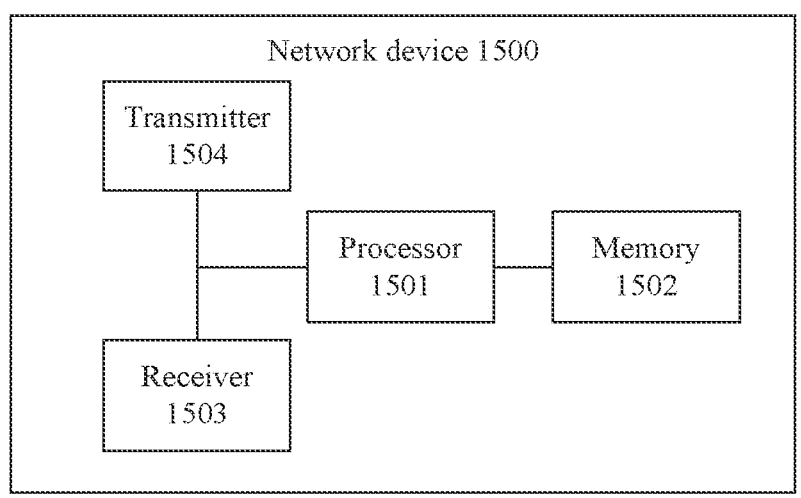
FIG. 19 is still another schematic block diagram of a network device according to an embodiment of this application.

FIG. 19 is a schematic structural diagram of a network device 1500 according to an embodiment of this application. As shown in FIG. 19, the network device 1500 includes a processor 1501, a memory 1502, a receiver 1503, and a transmitter 1504. These components communicate with and are connected to each other. The memory 1502 is configured to store an instruction. The processor 1501 is configured to: execute the instruction stored in the memory 1502, control the receiver 1503 to receive information, and control the transmitter 1504 to send information.

The processor 1501 is configured to execute the instruction stored in the memory 1502, the processor 1501 may be configured to perform a corresponding operation and/or function of the processing module 520 in the network device 500, and the receiver 1503 and the transmitter 1504 may be configured to perform a corresponding operation and/or function of the transceiver module 510 in the network device 500. For brevity, details are not described herein again.

Figure 20:
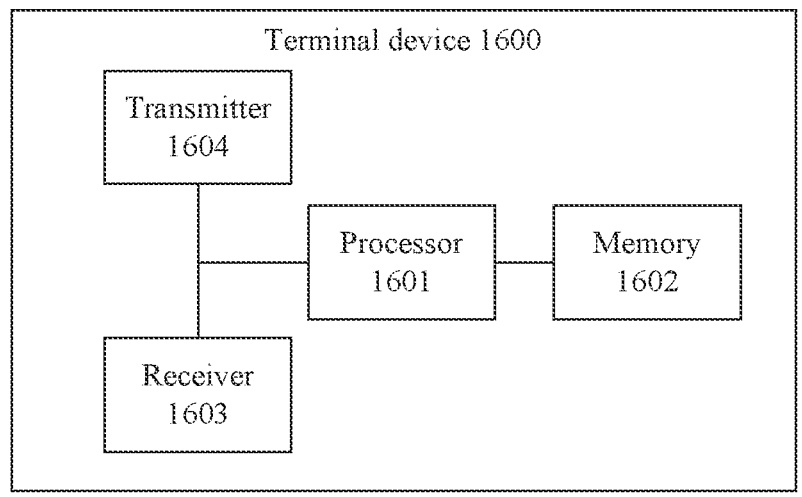
FIG. 20 is still another schematic block diagram of a terminal device according to an embodiment of this application.

FIG. 20 is a schematic structural diagram of a terminal device 1600 according to an embodiment of this application. As shown in FIG. 20, the terminal device 1600 includes a processor 1601, a memory 1602, a receiver 1603, and a transmitter 1604. These components communicate with and are connected to each other. The memory 1602 is configured to store an instruction. The processor 1601 is configured to: execute the instruction stored in the memory 1602, control the receiver 1603 to receive information, and control the transmitter 1604 to send information.

The processor 1601 is configured to execute the instruction stored in the memory 1602, the processor 1601 may be configured to perform a corresponding operation and/or function of the processing module 610 in the terminal device 600, and the receiver 1603 and the transmitter 1604 may be configured to perform a corresponding operation and/or function of the transceiver module 620 in the terminal device 600. For brevity, details are not described herein again.

Figure 21:
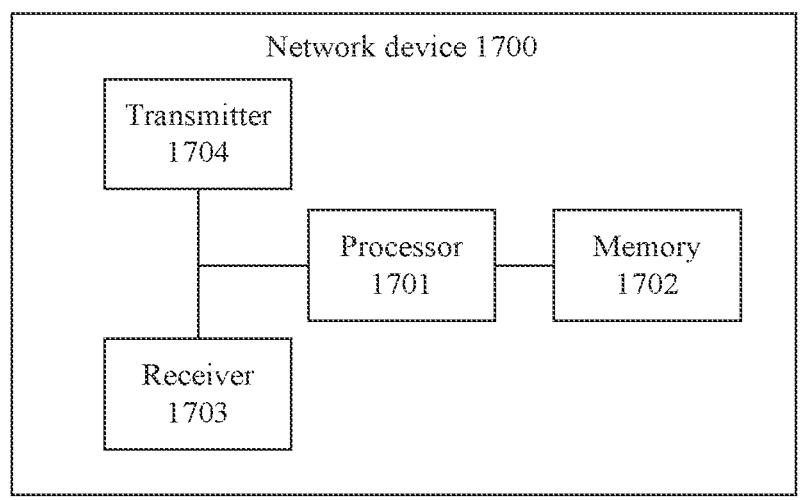
FIG. 21 is still another schematic block diagram of a network device according to an embodiment of this application.

FIG. 21 is a schematic structural diagram of a network device 1700 according to an embodiment of this application. As shown in FIG. 21, the network device 1700 includes a processor 1701, a memory 1702, a receiver 1703, and a transmitter 1704. These components communicate with and are connected to each other. The memory 1702 is configured to store an instruction. The processor 1701 is configured to: execute the instruction stored in the memory 1702, control the receiver 1703 to receive information, and control the transmitter 1704 to send information.

The processor 1701 is configured to execute the instruction stored in the memory 1702, the processor 1701 may be configured to perform a corresponding operation and/or function of the processing module 720 in the network device 700, and the receiver 1703 and the transmitter 1704 may be configured to perform a corresponding operation and/or function of the transceiver module 710 in the network device 700. For brevity, details are not described herein again.

Figure 22:
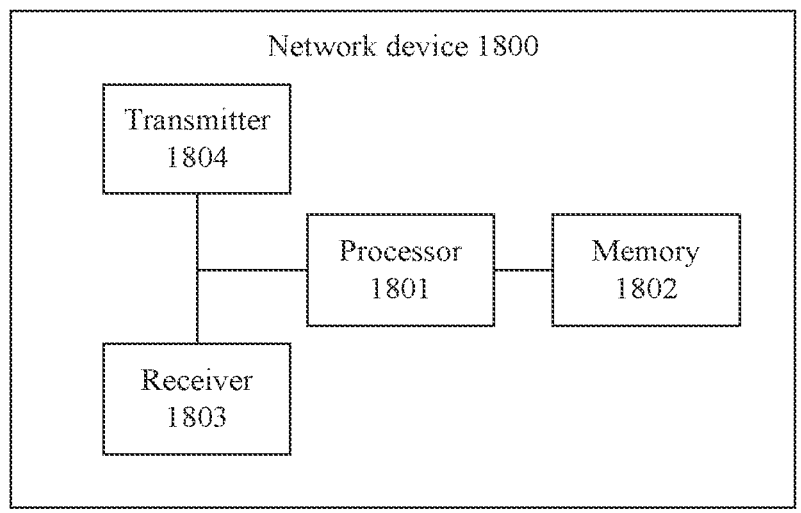
FIG. 22 is still another schematic block diagram of a network device according to an embodiment of this application.

FIG. 22 is a schematic structural diagram of a network device 1800 according to an embodiment of this application. As shown in FIG. 22, the network device 1800 includes a processor 1801, a memory 1802, a receiver 1803, and a transmitter 1804. These components communicate with and are connected to each other. The memory 1802 is configured to store an instruction. The processor 1801 is configured to: execute the instruction stored in the memory 1802, control the receiver 1803 to receive information, and control the transmitter 1804 to send information.

The processor 1801 is configured to execute the instruction stored in the memory 1802, the processor 1801 may be configured to perform a corresponding operation and/or function of the processing module 820 in the network device 800, and the receiver 1803 and the transmitter 1804 may be configured to perform a corresponding operation and/or function of the transceiver module 810 in the network device 800. For brevity, details are not described herein again.

Figure 23:
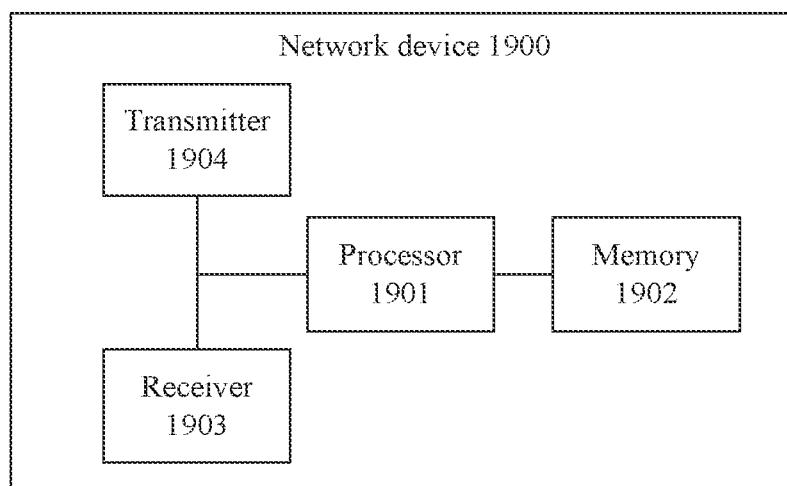
FIG. 23 is still another schematic block diagram of a network device according to an embodiment of this application.

FIG. 23 is a schematic structural diagram of a network device 1900 according to an embodiment of this application. As shown in FIG. 23, the network device 1900 includes a processor 1901, a memory 1902, a receiver 1903, and a transmitter 1904. These components communicate with and are connected to each other. The memory 1902 is configured to store an instruction. The processor 1901 is configured to: execute the instruction stored in the memory 1902, control the receiver 1903 to receive information, and control the transmitter 1904 to send information.

The processor 1901 is configured to execute the instruction stored in the memory 1902, the processor 1901 may be configured to perform a corresponding operation and/or function of the processing module 910 in the network device 900, and the receiver 1903 and the transmitter 1904 may be configured to perform a corresponding operation and/or function of the transceiver module 920 in the network device 900. For brevity, details are not described herein again.

Figure 24:
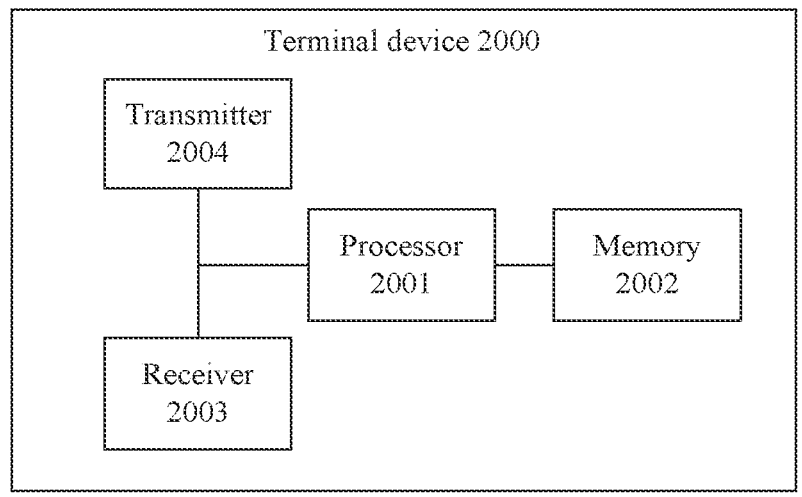
FIG. 24 is still another schematic block diagram of a terminal device according to an embodiment of this application.

FIG. 24 is a schematic structural diagram of a terminal device 2000 according to an embodiment of this application. As shown in FIG. 24, the terminal device 2000 includes a processor 2001, a memory 2002, a receiver 2003, and a transmitter 2004. These components communicate with and are connected to each other. The memory 2002 is configured to store an instruction. The processor 2001 is configured to: execute the instruction stored in the memory 2002, control the receiver 2003 to receive information, and control the transmitter 2004 to send information.

The processor 2001 is configured to execute the instruction stored in the memory 2002, the processor 2001 may be configured to perform a corresponding operation and/or function of the processing module 1020 in the terminal device 1000, and the receiver 2003 and the transmitter 2004 may be configured to perform a corresponding operation and/or function of the transceiver module 1010 in the terminal device 1000. For brevity, details are not described herein again.

Figure 25:
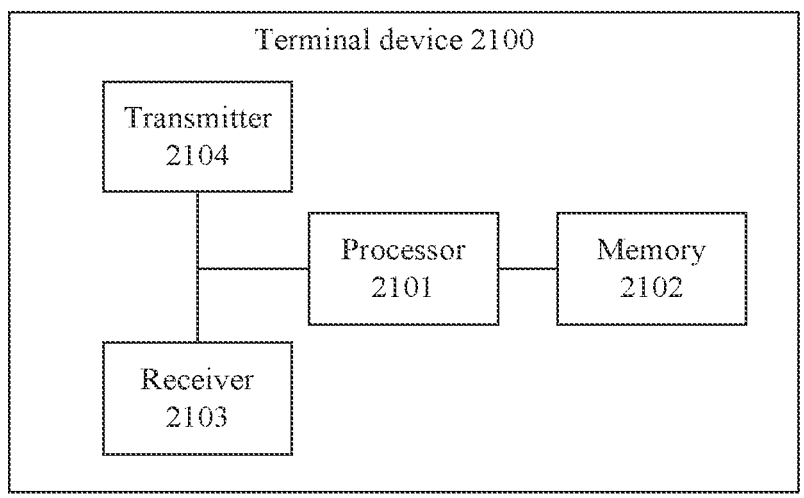
FIG. 25 is still another schematic block diagram of a terminal device according to an embodiment of this application.

FIG. 25 is a schematic structural diagram of a terminal device 2100 according to an embodiment of this application. As shown in FIG. 25, the terminal device 2100 includes a processor 2101, a memory 2102, a receiver 2103, and a transmitter 2104. These components communicate with and are connected to each other. The memory 2102 is configured to store an instruction. The processor 2101 is configured to: execute the instruction stored in the memory 2102, control the receiver 2103 to receive information, and control the transmitter 2104 to send information.

The processor 2101 is configured to execute the instruction stored in execute the memory 2102, the processor 2101 may be configured to perform a corresponding operation and/or function of the processing module 1120 in the terminal device 1100, and the receiver 2103 and the transmitter 2104 may be configured to perform a corresponding operation and/or function of the transceiver module 1110 in the terminal device 1100. For brevity, details are not described herein again.

Figure 26:
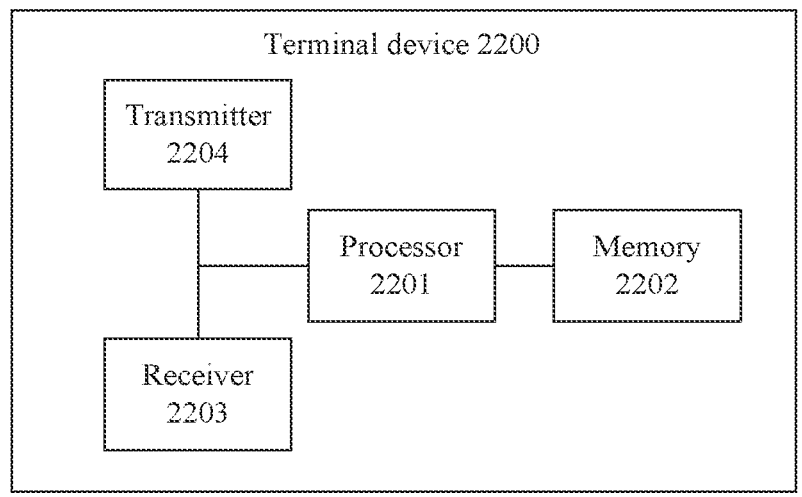
FIG. 26 is still another schematic block diagram of a terminal device according to an embodiment of this application.

FIG. 26 is a schematic structural diagram of a terminal device 2200 according to an embodiment of this application. As shown in FIG. 26, the terminal device 2200 includes a processor 2201, a memory 2202, a receiver 2203, and a transmitter 2204. These components communicate with and are connected to each other. The memory 2202 is configured to store an instruction. The processor 2201 is configured to: execute the instruction stored in the memory 2202, control the receiver 2203 to receive information, and control the transmitter 2204 to send information.

The processor 2201 is configured to execute the instruction stored in the memory 2202, the processor 2201 may be configured to perform a corresponding operation and/or function of the processing module 1210 in the terminal device 1200, and the receiver 2203 and the transmitter 2204 may be configured to perform a corresponding operation and/or function of the transceiver module 1220 in the terminal device 1200. For brevity, details are not described herein again.

Figure 27:
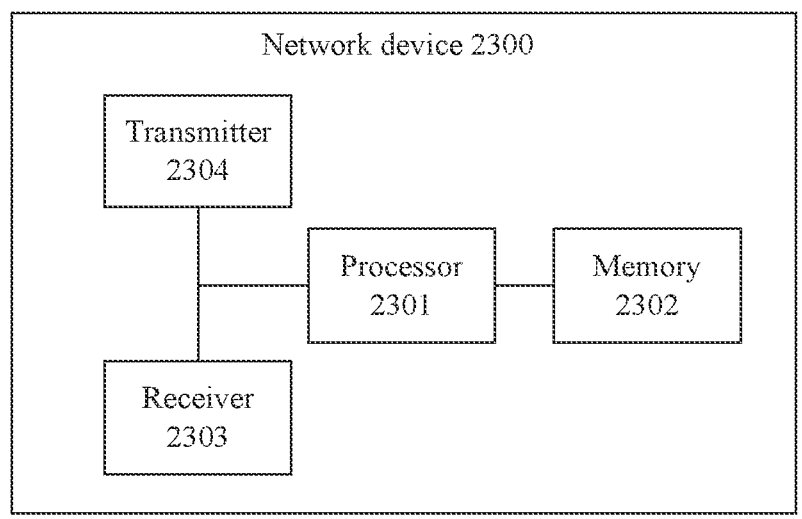
FIG. 27 is still another schematic block diagram of a network device according to an embodiment of this application.

FIG. 27 is a schematic structural diagram of a network device 2300 according to an embodiment of this application. As shown in FIG. 27, the network device 2300 includes a processor 2301, a memory 2302, a receiver 2303, and a transmitter 2304. These components communicate with and are connected to each other. The memory 2302 is configured to store an instruction. The processor 2301 is configured to: execute the instruction stored in the memory 2302, control the receiver 2303 to receive information, and control the transmitter 2304 to send information.

The processor 2301 is configured to execute the instruction stored in the memory 2302, the processor 2301 may be configured to perform a corresponding operation and/or function of the processing module 1310 in the network device 1300, and the receiver 2303 and the transmitter 2304 may be configured to perform a corresponding operation and/or function of the transceiver module 1320 in the network device 1300. For brevity, details are not described herein again.

An embodiment of this application further provides a system chip. The system chip includes an input/output interface, at least one processor, at least one memory, and a bus, where the at least one memory is configured to store an instruction, and the at least one processor is configured to invoke the instruction in the at least one memory, to perform operations in the methods according to the foregoing aspects.

In the embodiments of this application, it should be noted that the foregoing method embodiments in the embodiments of this application may be applied to a processor, or may be implemented by a processor. The processor may be an integrated circuit chip and has a signal processing capability. In an implementation process, the steps in the foregoing method embodiments may be implemented by using a hardware integrated logic circuit in the processor, or by using instructions in a form of software. The foregoing processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or a transistor logic device, or a discrete hardware component. It may implement or perform the methods, the steps, and logical block diagrams that are disclosed in the embodiments of this application. The general purpose processor may be a microprocessor or the processor may be any conventional processor, or the like. Steps of the methods disclosed in the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory or an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the system and the method described in this specification intends to include, but is not limited to, these memories and any other appropriate types of memories.

It should be understood that "one embodiment" or "an embodiment" mentioned in the entire specification mean that particular features, structures, or characteristics related to the embodiment are included in at least one embodiment of this application. Therefore, "in one embodiment" or "in an embodiment" appearing throughout this specification may be not necessarily a same embodiment. Moreover, the particular features, structure or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should be further understood that determining A based on B does not mean that B is determined based on A only; that is, B may also be determined based on A and/or other information.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic disk), an optical medium (for example, a DVD), a semiconductor medium (for example, a solid state disk Solid State Disk (SSD)), or the like.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, the apparatus, and the unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving, by a first network node, a first report from a terminal device, wherein the first report indicates an uplink data volume of a buffer of the terminal device, and the first network node is a data unit (DU) of a base station;
   determining, by the first network node, based on the uplink data volume of the buffer of the terminal device, a need to switch the terminal device to an active state or perform offloading configuration of a radio bearer for the terminal device; and
   transmitting, by the first network node, first indication information to a second network node, wherein the second network node is a central unit (CU) of the base station, and wherein the first indication information comprises information about the uplink data volume of the buffer of the terminal device, or the first indication information indicates a relationship between the uplink data volume of the buffer of the terminal device and a predefined data volume threshold, and the first indication information instructs the second network node to switch the terminal device to the active state or perform offloading configuration of the radio bearer for the terminal device.

2. The method according to claim 1, wherein the method further comprises:
   receiving, by the first network node, second indication information from the second network node, wherein the second indication information indicates the predefined data volume threshold, or the second indication information instructs the first network node to send information about the uplink data volume of the buffer of the terminal device to the second network node.

3. The method according to claim 1, wherein the method further comprises:
   receiving, by the first network node from the terminal device, a report indicating the uplink data volume of the buffer of the terminal device.

4. The method according to claim 1, wherein:
   the first network node comprises one or more of: a function of a radio link control protocol layer, a function of a media access control layer, or a function of a physical layer.

5. A first network node, comprising:
   at least one processor; and
   one or more memories coupled to the at least one processor and storing programming instructions for execution by the at least one processor, the programming instructions instruct the at least one processor to perform operations comprising:
   receiving a first report from a terminal device, wherein the first report indicates an uplink data volume of a buffer of the terminal device, and the first network node is a data unit (DU) of a base station;
   determining, based on the uplink data volume of the buffer of the terminal device, a need to switch the terminal device to an active state or perform offloading configuration of a radio bearer for the terminal device; and
   transmitting, first indication information to a second network node, wherein the second network node is a central unit (CU) of the base station, and wherein the first indication information comprises information about the uplink data volume of the buffer of the terminal device, or the first indication information indicates a relationship between the uplink data volume of the buffer of the terminal device and a predefined data volume threshold, and the first indication information instructs the second network node to switch the terminal device to the active state or perform offloading configuration of the radio bearer for the terminal device.

6. The first network node according to claim 5, wherein the operations further comprise:
   receiving, second indication information from the second network node, wherein the second indication information indicates the predefined data volume threshold, or the second indication information instructs the first network node to send information about the uplink data volume of the buffer of the terminal device to the second network node.

7. The first network node according to claim 5, wherein the operations further comprise:
   receiving, from the terminal device a report indicating the uplink data volume of the buffer of the terminal device.

8. The first network node according to claim 5, wherein:
   the first network node comprises one or more of: a function of a radio link control protocol layer, a function of a media access control layer, or a function of a physical layer.

9. The method according to claim 1, wherein:
   the second network node comprises one or more of: a function of a packet data convergence protocol layer, a function of a service data adaptation layer, or a radio resource control function.

10. The first network node according to claim 5, wherein:
    the second network node comprises one or more of: a function of a packet data convergence protocol layer, a function of a service data adaptation layer, or a radio resource control function.

11. A non-transitory, computer-readable medium storing one or more instructions executable by a first network node to perform operations comprising:
    receiving, by a first network node, a first report from a terminal device, wherein the first report indicates an uplink data volume of a buffer of the terminal device, and the first network node is a data unit (DU) of a base station;

determining, by the first network node, based on the uplink data volume of the buffer of the terminal device, a need to switch the terminal device to an active state or perform offloading configuration of a radio bearer for the terminal device; and transmitting, by the first network node, first indication information to a second network node, wherein the second network node is a central unit (CU) of the base station, and wherein the first indication information comprises information about the uplink data volume of the buffer of the terminal device, or the first indication information indicates a relationship between the uplink data volume of the buffer of the terminal device and a predefined data volume threshold, and the first indication information instructs the second network node to switch the terminal device to the active state or perform offloading configuration of the radio bearer for the terminal device.

12. The non-transitory, computer-readable medium according to claim 11, wherein the operations further comprise:

receiving, second indication information from the second network node, wherein the second indication information indicates the predefined data volume threshold, or the second indication information instructs the first network node to send information about the uplink data volume of the buffer of the terminal device to the second network node.

13. The non-transitory, computer-readable medium according to claim 11, wherein the operations further comprise:

receiving, from the terminal device a report indicating the uplink data volume of the buffer of the terminal device.

14. The non-transitory, computer-readable medium according to claim 11, wherein:

the first network node comprises one or more of: a function of a radio link control protocol layer, a function of a media access control layer, or a function of a physical layer.

15. The non-transitory, computer-readable medium according to claim 11, wherein:

the second network node comprises one or more of: a function of a packet data convergence protocol layer, a function of a service data adaptation layer, or a radio resource control function.

* * * * *